(12) United States Patent
Yamanaka

(10) Patent No.: US 7,227,574 B2
(45) Date of Patent: Jun. 5, 2007

(54) IMAGE CAPTURING APPARATUS

(75) Inventor: Mutsuhiro Yamanaka, Suita (JP)

(73) Assignee: Minolta Co., Ltd., Osaka (JP)

( * ) Notice: Subject to any disclaimer, the term of this patent is extended or adjusted under 35 U.S.C. 154(b) by 888 days.

(21) Appl. No.: 10/440,794

(22) Filed: May 19, 2003

(65) Prior Publication Data

US 2004/0150732 A1 Aug. 5, 2004

(30) Foreign Application Priority Data

Feb. 5, 2003 (JP) ............................ P2003-028306

(51) Int. Cl.
*H04N 9/64* (2006.01)
(52) U.S. Cl. ..................................... 348/242
(58) Field of Classification Search ................ 382/167, 382/275; 348/242, 222.1
See application file for complete search history.

(56) References Cited

U.S. PATENT DOCUMENTS

| 6,219,446 B1 * | 4/2001 | Kiriki et al. ................. 382/167 |
| 6,697,522 B1 * | 2/2004 | Ishikawa ..................... 382/167 |
| 6,853,400 B1 * | 2/2005 | Matama ....................... 348/241 |
| 2005/0069218 A1 * | 3/2005 | Chen .......................... 382/274 |
| 2006/0245646 A1 * | 11/2006 | Ishiga ......................... 382/167 |

FOREIGN PATENT DOCUMENTS

| JP | 1-126075 A |   | 5/1989 |
| JP | 2-23790 A |   | 1/1990 |
| JP | 05-003568 A |   | 1/1993 |
| JP | 06153065 A | * | 5/1994 |
| JP | 06-350904 A |   | 12/1994 |
| JP | 2000-287219 A |   | 10/2000 |
| JP | 2001-186533 A |   | 7/2001 |
| JP | 2002-199410 A |   | 7/2002 |
| JP | 2002-209224 A |   | 7/2002 |

OTHER PUBLICATIONS

Notification of Reason(s) for Refusal, dated Feb. 7, 2006, for counterpart Japanese Patent Application No. 2003-028306; along with an English-language translation thereof.

* cited by examiner

*Primary Examiner*—Vivek Srivastava
*Assistant Examiner*—Jason Whipkey
(74) *Attorney, Agent, or Firm*—Sidley Austin LLP

(57) ABSTRACT

An object of the present invention is to realize an image processing technique of making chromatic aberration correction excellently function and capable of efficiently correcting a chromatic aberration and to reduce storage capacity of parameters used for the chromatic aberration correction. It is constructed so that an image processing unit concurrently performs a chromatic aberration correcting process of correcting a chromatic aberration by an image capturing optical system and a color interpolating process of interpolating a dropout color component pixel by pixel on an image signal obtained from an image capturing device. On the basis of position information of a pixel to be processed obtained from the image processing unit, a control unit determines an image filter to be applied to the pixel. For example, an image filter is generated by combining a filter for chromatic aberration correction and a filter for color interpolating process. The image filter is applied, filter computation is performed on the image signal, and the chromatic aberration correcting process and the color interpolating process are concurrently performed.

8 Claims, 16 Drawing Sheets

F I G. 2
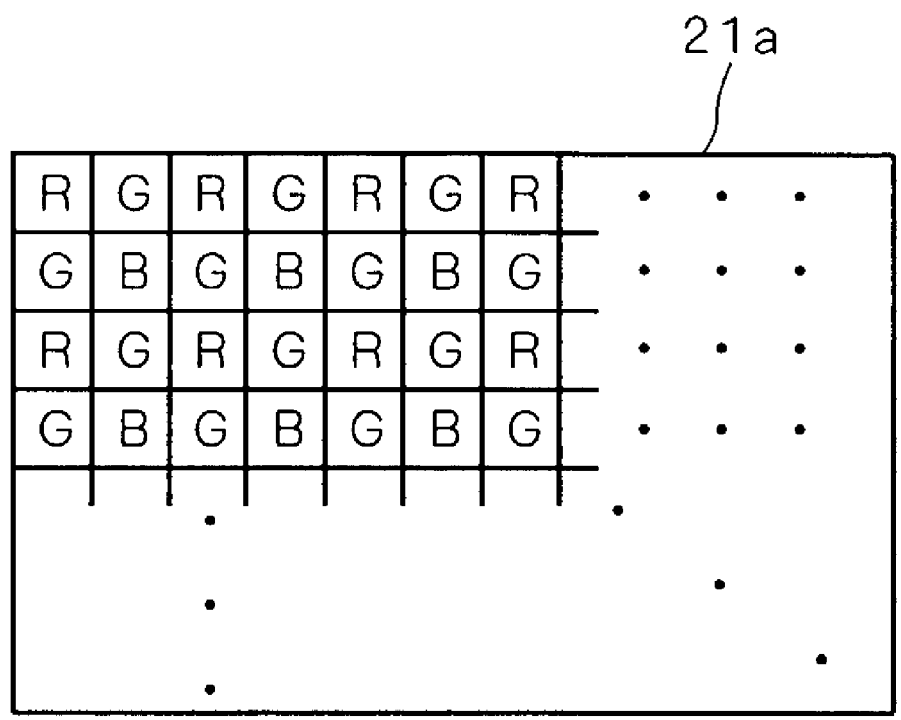

|   |   |   |
|---|---|---|
| 1 | 2 | 1 |
| 2 | 4 | 2 |
| 1 | 2 | 1 |

201

|   |   |   |   |   |
|---|---|---|---|---|
| 0 | 0 | 0 | 1 | 1 |
| 0 | 0 | 0 | 1 | 1 |
| 0 | 0 | 0 | 0 | 0 |
| 0 | 0 | 0 | 0 | 0 |
| 0 | 0 | 0 | 0 | 0 |

202

|   |   |   |   |   |   |   |
|---|---|---|---|---|---|---|
| 0 | 0 | 0 | 1 | 3 | 3 | 1 |
| 0 | 0 | 0 | 3 | 9 | 9 | 3 |
| 0 | 0 | 0 | 3 | 9 | 9 | 3 |
| 0 | 0 | 0 | 1 | 3 | 3 | 1 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

| IMAGE CAPTURING CONDITIONS ||| COEFFICIENTS OF APPROXIMATION FUNCTION ||||
|---|---|---|---|---|---|---|
| FOCAL LENGTH | PHOTOGRAPHING DISTANCE | f-NUMBER | a | b | c | d |
| 5~10mm | 2~5m | F2 | 1.234 | 0.123 | 2.345 | 0 |
| | | F4 | 2.345 | 0.234 | 3.456 | 0.001 |
| | | F8 | 3.456 | 0.345 | 4.567 | 0.002 |
| | 5~10m | F2 | 1.357 ⋮ | 0.135 ⋮ | 0.246 ⋮ | 0.003 ⋮ |
| | 10m~ | F2 | 3.579 ⋮ | 0.357 ⋮ | 0.468 ⋮ | 0.004 ⋮ |
| 10~30mm | 2~5m | F2 | 2.345 ⋮ | 0.234 ⋮ | 0.357 ⋮ | 0.005 ⋮ |

FIG. 9

| IMAGE CAPTURING CONDITIONS ||| COEFFICIENTS OF APPROXIMATION FUNCTION ||||
|---|---|---|---|---|---|---|
| FOCAL LENGTH | PHOTOGRAPHING DISTANCE | f-NUMBER | a | b | c | d |
| 5~10mm | 2~5m | F2 | -1.234 | -0.123 | -2.345 | 0 |
| | | F4 | -2.345 | -0.234 | -3.456 | -0.001 |
| | | F8 | -3.456 | -0.345 | -4.567 | -0.002 |
| | 5~10m | F2 | -1.357 ⋮ | -0.135 ⋮ | -0.246 ⋮ | -0.003 ⋮ |
| | 10m~ | F2 | -3.579 ⋮ | -0.357 ⋮ | -0.468 ⋮ | -0.004 ⋮ |
| 10~30mm | 2~5m | F2 | -2.345 ⋮ | -0.234 ⋮ | -0.357 ⋮ | -0.005 ⋮ |

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 1 | 3 | 3 | 1 | 0 | 0 | 0 |
| 3 | 9 | 9 | 3 | 0 | 0 | 0 |
| 3 | 9 | 9 | 3 | 0 | 0 | 0 |
| 1 | 3 | 3 | 1 | 0 | 0 | 0 |

| COORDINATES OF POSITION OF IMAGE TO BE PROCESSED | | MOVEMENT AMOUNT BY CHROMATIC ABERRATION | |
|---|---|---|---|
| x | y | $\Delta rx$ | $\Delta ry$ |
| ⋮ | ⋮ | ⋮ | ⋮ |
| 1324 | 256 | 1.33 | 0.88 |
| 1324 | 257 | 1.32 | 0.87 |
| 1324 | 258 | 1.32 | 0.86 |
| ⋮ | ⋮ | ⋮ | ⋮ |

301

| NUMBER OF CORRECTION BLOCK | MOVEMENT AMOUNT BY CHROMATIC ABERRATION 302 | |
|---|---|---|
| | Δrx | Δry |
| B01 | 0.00 | 0.42 |
| B02 | 0.13 | 0.47 |
| B03 | 0.56 | 0.56 |
| B04 | 0.82 | 0.76 |
| ⋮ | ⋮ | ⋮ |

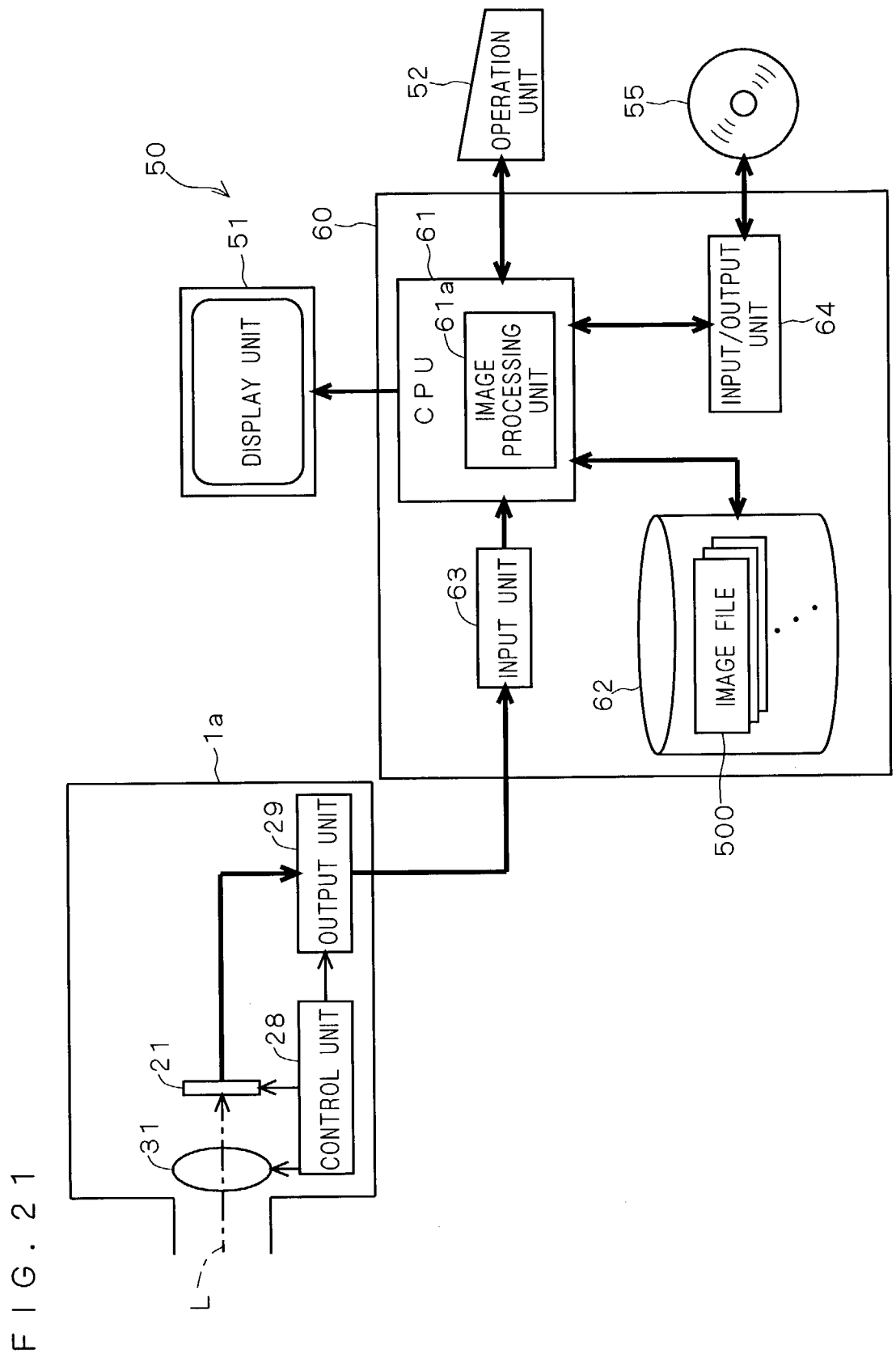

IMAGE CAPTURING APPARATUS

This application is based on application No. 2003-028306 filed in Japan, the contents of which are hereby incorporated by reference.

BACKGROUND OF THE INVENTION

1. Field of the Invention

The present invention relates to an image processing technique in an image capturing apparatus, an image processing apparatus or the like, and more particularly to a technique of correcting a chromatic aberration caused by an image capturing optical system on an image signal obtained by photoelectrically converting a light image entered via the image capturing optical system.

2. Description of the Background Art

In an image capturing apparatus such as a digital camera, a light image from the subject is led to an image capturing device such as a CCD via an image capturing optical system (taking lens).

In recent years, as reduction in the size of an image capturing device and increase in pixel resolution advance, aberration correction conditions requested for an image capturing optical system are becoming severer from the viewpoint of designing. In addition, miniaturization is demanded also for the image capturing optical system and designing of the optical system is becoming severer.

A particularly obtrusive aberration among the aberrations of the image capturing optical system is a magnification chromatic aberration (hereinafter, also simply referred to as chromatic aberration). Examples of known techniques of correcting a magnification chromatic aberration by image processing include a technique of correcting a magnification chromatic aberration by storing outputted image signals for each of color components of R (red), G (green) and B (blue) into a memory and moving and synthesizing the image signal on a pixel unit basis in accordance with the state of zooming and focusing of a taking lens (for example, Japanese Patent Application Laid-Open No. 5-3568 (1993) (hereinafter, referred to as Patent Literature 1)), and a technique of constructing an image capturing device by four CCDs and correcting a magnification chromatic aberration in accordance with the position of each CCD (for example, Japanese Patent Application Laid-Open No. 6-350904 (1994) (hereinafter, referred to as Patent Literature 2).

As disclosed in Japanese Patent Application Laid-Open No. 2002-209224 (hereinafter, referred to as Patent Literature 3), when a single-chip color image capturing device such as a CCD is used as an image capturing device, only a charge corresponding to one of primary color components of the three primary colors is accumulated in each pixel. Consequently, in order to obtain signals of color components of all of R, G and B with respect to each pixel, a color interpolating process (pixel interpolating process) has to be performed.

Even when one of the techniques of Patent Literatures 1 and 2 is used, the following problem occurs. Specifically, in any of the techniques of Patent Literatures 1 and 2, a chromatic aberration correcting process is performed after a color interpolating process. After a color interpolating process is performed on an image including a chromatic aberration, the chromatic aberration correcting process is performed. It is therefore difficult to make the chromatic aberration correction properly and sufficiently function. As a result, although the chromatic aberration correcting process is performed also in the conventional techniques, a problem such that a chromatic aberration is still conspicuous in a reproduced image occurs.

Conventionally, it is not considered to reduce a storage amount at the time of storing parameters and the like used at the time of correcting a chromatic aberration. When the pixel density of an image capturing device is conspicuously increasing as in recent years, the capacity necessary to store parameters and the like becomes enormous. It hinders reduction in the size of an apparatus and also causes a problem such as an increase in cost.

SUMMARY OF THE INVENTION

The present invention is directed to an image capturing apparatus.

According to an aspect of the present invention, an image capturing apparatus comprises: an image capturing optical system; a color image sensor for converting a light image obtained by said image capturing optical system to an image signal having a color component which varies according to a pixel; and an image processor for concurrently performing a chromatic aberration correcting process of correcting a chromatic aberration of said image capturing optical system and a color interpolating process of interpolating a dropout color component pixel by pixel on an image signal generated by said color image sensor.

With this configuration, chromatic aberration correction can be made to function excellently and high-precision chromatic aberration correction can be performed. Since the chromatic aberration correcting process and the color interpolating process are concurrently performed, processing efficiency is improved.

According to another aspect of the present invention, an image capturing apparatus comprises: an image capturing optical system; a color image sensor for converting a light image obtained by said image capturing optical system into an image signal having a color component which varies according to a pixel; a divider for dividing an image signal generated by the color image sensor into a plurality of blocks; a memory for storing a parameter for chromatic aberration correction applied to each block divided by the divider; and an image processor for correcting a chromatic aberration caused by said image capturing optical system by the block on the basis of the parameter stored in said memory on an image signal generated by said color image sensor.

Consequently, the number of parameters to be stored in a memory may be the number corresponding to the number of blocks. Therefore, it becomes unnecessary to store parameters of all of pixels, so that an amount of information stored in the memory can be excellently reduced.

According to still another aspect of the present invention, an image capturing apparatus comprises: an image capturing optical system; a color image sensor for converting a light image obtained by said image capturing optical system into an image signal of a color component which varies according to a pixel; a memory for storing a parameter for approximating a chromatic aberration caused by said image capturing optical system; and an image processor for performing a chromatic aberration correcting process on an image signal generated by said color image sensor by performing computation with an approximation function by using the parameter stored in said memory.

With this configuration, since a deviation amount can be estimated by using an approximation function, while maintaining correction precision in a predetermined range, the storage capacity of parameters can be reduced as compared with the case of storing an accurate deviation amount for each pixel.

Further, the present invention is also directed to an image processing apparatus for performing an image process on an image signal which is generated on the basis of a light image received via an image capturing optical system and has a color component which varies according to a pixel, and a program product in which a program of allowing a computer to perform a predetermined process on an image signal which is generated on the basis of a light image received via an image capturing optical system and has a color component which varies according to a pixel.

As described above, an object of the present invention is to realize an image processing technique of making chromatic aberration correction excellently function and capable of efficiently correcting a chromatic aberration, and to provide a technique of reducing storage capacity of parameters used for the chromatic aberration correction.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing a light-receiving face of an image capturing device;

FIG. 8 is a diagram showing an example of the relationship between image capturing conditions and coefficients of an approximation function stored with respect to an R component;

FIG. 9 is a diagram showing an example of the relationship between image capturing conditions and coefficients of an approximation function stored with respect to a B component;

FIG. 21 is a diagram showing the configuration of an image processing system;

DESCRIPTION OF THE PREFERRED EMBODIMENTS

Hereinafter, preferred embodiments of the present invention will be described in detail with reference to the drawings.

1. First Preferred Embodiment

A first preferred embodiment will be described. In the present preferred embodiment, an example of a configuration for excellently performing chromatic aberration correction in an image capturing apparatus such as a digital camera will be described.

Figure 1:
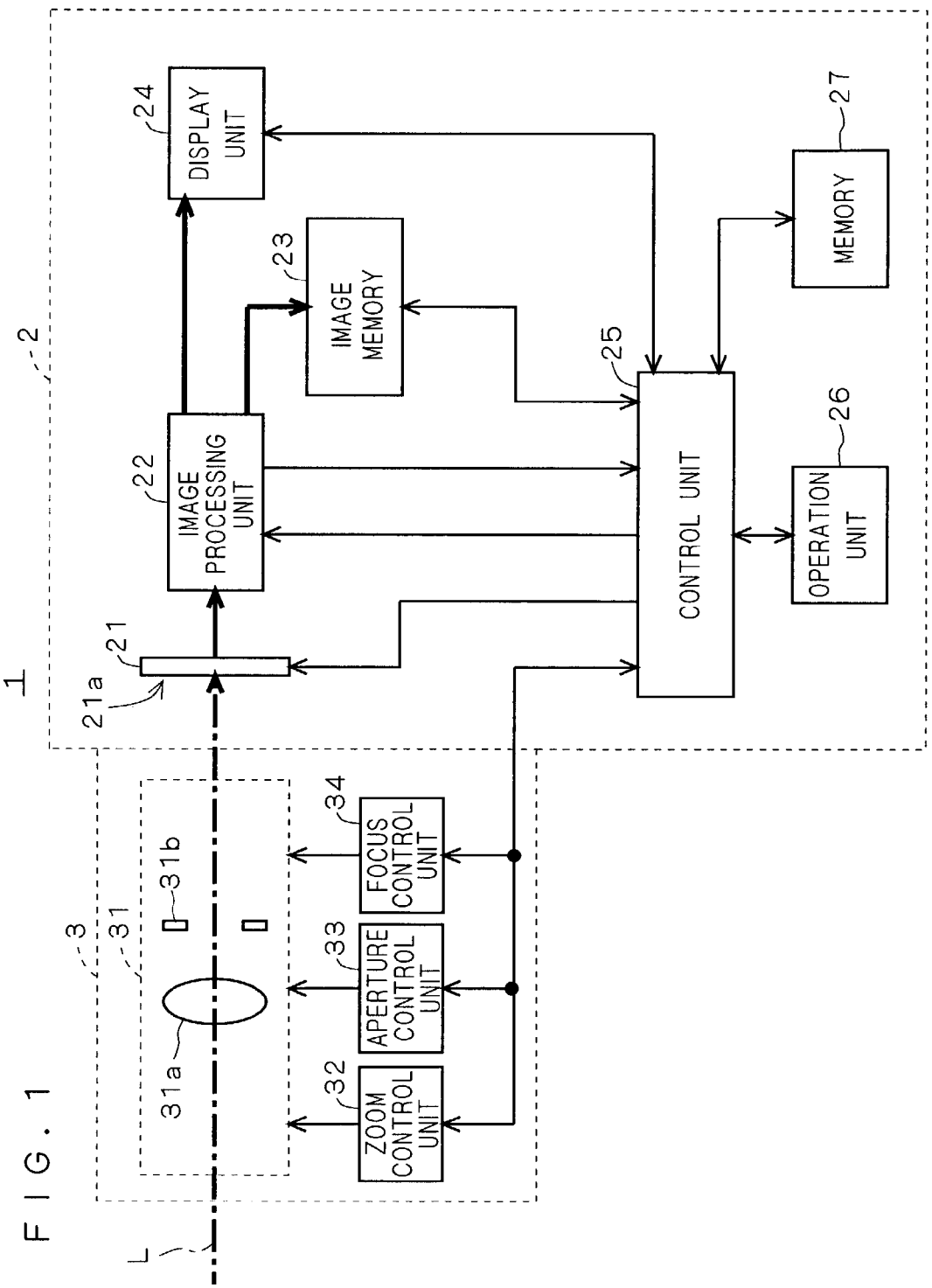
FIG. 1 is a block diagram showing a schematic configuration of an image capturing apparatus.

FIG. 1 is a block diagram showing a schematic configuration of an image capturing apparatus 1. As shown in FIG. 1, the image capturing apparatus 1 has a body 2 and a lens unit 3. The lens unit 3 is constructed so that it can be separated from the body 2.

The lens unit 3 has an image capturing optical system 31, a zoom control unit 32, an aperture control unit 33 and a focus control unit 34. The image capturing optical system 31 has a lens 31a and an aperture member 31b disposed on an optical axis L to lead a light image of a subject to the body 2. The zoom control unit 32 changes a focal length by driving the image capturing optical system 31, thereby changing a magnification. The aperture control unit 33 adjusts the opening diameter of the aperture member 31b included in the image capturing optical system 31. The focus control unit 34 drives the image capturing optical system 31 so that a proper focus state is realized in accordance with the distance between the subject and the image capturing apparatus. Each of the zoom control unit 32, aperture control unit 33, and focus control unit 34 drives and controls the image capturing optical system 31 on the basis of a control signal supplied from a control unit 25 of the body 2.

The body 2 includes an image capturing device 21, an image processing unit 22, an image memory 23, a display unit 24, the control unit 25, an operation unit 26 and a memory 27.

The image capturing device 21 takes the form of, for example, a single-chip CCD image sensor and has a structure in which a plurality of pixels are disposed two-dimensionally on a light-receiving face 21a perpendicular to the optical axis L. The image capturing device 21 is disposed so that the center of the light-receiving face 21a coincides with the center of the optical axis L. FIG. 2 is a diagram showing the light-receiving face of the image capturing device 21. As shown in FIG. 2, a color filter array of a so-called Bayer matrix is disposed on the light-receiving face of the image capturing device 21. Each pixel receives light of the color component of any one of the three primary colors of R, G and B. Consequently, charges according to a light amount of the color component received are accumulated in each pixel. In the image capturing device 21, a color component which varies according to a pixel out of the three primary colors of R, G and B is detected pixel by pixel and pixel signals are generated. Color image signals of one frame are generated by a collection of a plurality of the pixel signals. The image capturing device 21 has, therefore, the function of photoelectrically converting a light image entering via the image capturing optical system 31 into image signals of different color components pixel by pixel. The image signal obtained is converted to, for example, a 12-bit digital signal by a not-shown A/D converter, and the digital signal is outputted to the image processing unit 22.

In the image signal outputted to the image processing unit 22, each pixel has information of the color component of any of the three primary colors of R, G and B. The image signal is an image signal including a chromatic aberration caused by the image capturing optical system 31.

Figures 4, 5, 6, 7:
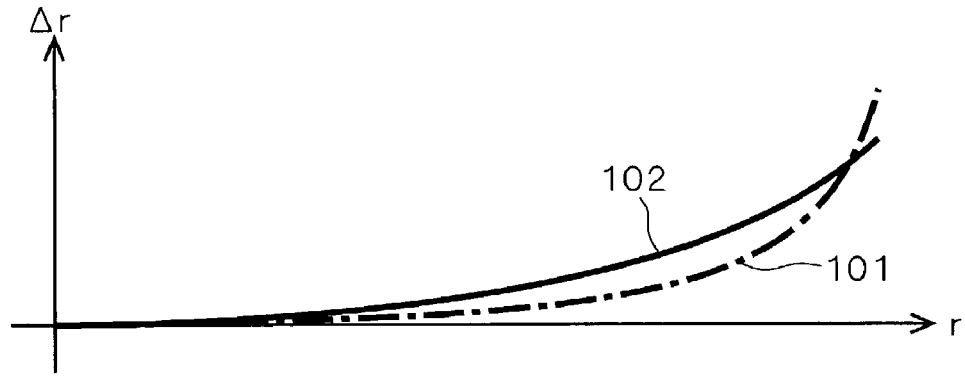
FIG. 4 is a diagram showing a magnification chromatic aberration of an image capturing optical system under an image capturing condition.
FIG. 5 is a diagram showing an example of an image filter applied to a color interpolating process.
FIG. 6 is a diagram showing an example of an image filter applied to a chromatic aberration correcting process.
FIG. 7 is a diagram showing an example of an image filter for concurrently performing the color interpolating process and the chromatic aberration correcting process.

Generally, the chromatic aberration caused by the image capturing optical system 31 increases with distance from the center of the optical axis L in the light-receiving face of the image capturing device 21. FIG. 4 is a diagram showing a magnification chromatic aberration under certain image capturing conditions of the image capturing optical system 31. It shows the relationship between a distance "r" from the center of an image (center of the optical axis L) and a deviation amount ($\Delta r$) of an image formation position of light of an R component from an image formation position of light of a G component. A chromatic aberration 101 of the R component light is obtained by optical simulation or actual measurement as a deviation in the radial direction from the center of the optical axis as a reference on an image of the R component light from the G component. The chromatic aberration 101 increases with distance from the center of the optical axis L. In other words, even when light is from the same position of the subject, the image formation position of the G component and that of the R component do not coincide with each other and the deviation amount increases toward the peripheral portion of the image.

The above is similarly applied to light of the B component. Generally, when the G component is used as a reference, the aberration of light of the B component appears on the side opposite to the aberration of light of the R component (that is, $-\Delta r$ side in FIG. 4). In a manner similar to the R component, the aberration of the B component light increases with distance from the center of the optical axis L.

Therefore, the image processing unit 22 is constructed so as to correct the chromatic aberration which is caused by the image capturing optical system 31. As will be described later, the image processing unit 22 is constructed so as to perform not only the chromatic aberration correcting process but also other various image processes.

An image signal subjected to the image process in the image processing unit 22 is outputted to at least one of the image memory 23 and the display unit 24. The image memory 23 is a recording medium such as a semiconductor memory for recording image signals. The image memory 23 may be constructed like a memory card so as to be removable from the image capturing apparatus 1. The display unit 24 is a display device provided on the rear face side or the like of the body 2 and is, for example, a liquid crystal display.

The operation unit 26 is operation members such as a switch and a button provided for the user to enter operation instructions for the image capturing apparatus 1. An operation instructed to the operation unit 26 is converted to an electric signal and the electric signal is supplied to the control unit 25.

The control unit 25 is a function realized when a CPU provided in the body 2 executes a predetermined program. The control unit 25 controls various members provided for the body 2 and also controls the state of the image capturing optical system 31 by transmitting control signals to the zoom control unit 32, aperture control unit 33 and focus control unit 34 provided for the lens unit 3. For example, when the user operates the operation unit 26 to change the magnification, the control unit 25 transmits a control signal of changing the focal length of the zoom control unit 32 on the basis of the operation amount. Consequently, the control unit 25 can identify the state of the image capturing optical system at the time of photographing (hereinafter, referred to as the image capturing condition).

The control unit 25 determines an image filter (hereinafter, simply referred to as a filter) applied when the color interpolating process and chromatic aberration correcting process are performed in the image processing unit 22 and supplies the filter to the image processing unit 22. In order to determine the filter, the memory 27 is provided in the body 2. In the memory 27, various parameters based on the optical characteristics of the image capturing optical system 31 and the image capturing conditions at the time of photographing are stored. Therefore, the control unit 25 is constructed to determine a filter by referring to information stored in the memory 27.

The image processing unit 22 performs filter computation by using the filter supplied from the control unit 25 at the time of performing the color interpolating process and chromatic aberration correcting process on an image signal obtained from the image capturing device 21.

Figure 3:
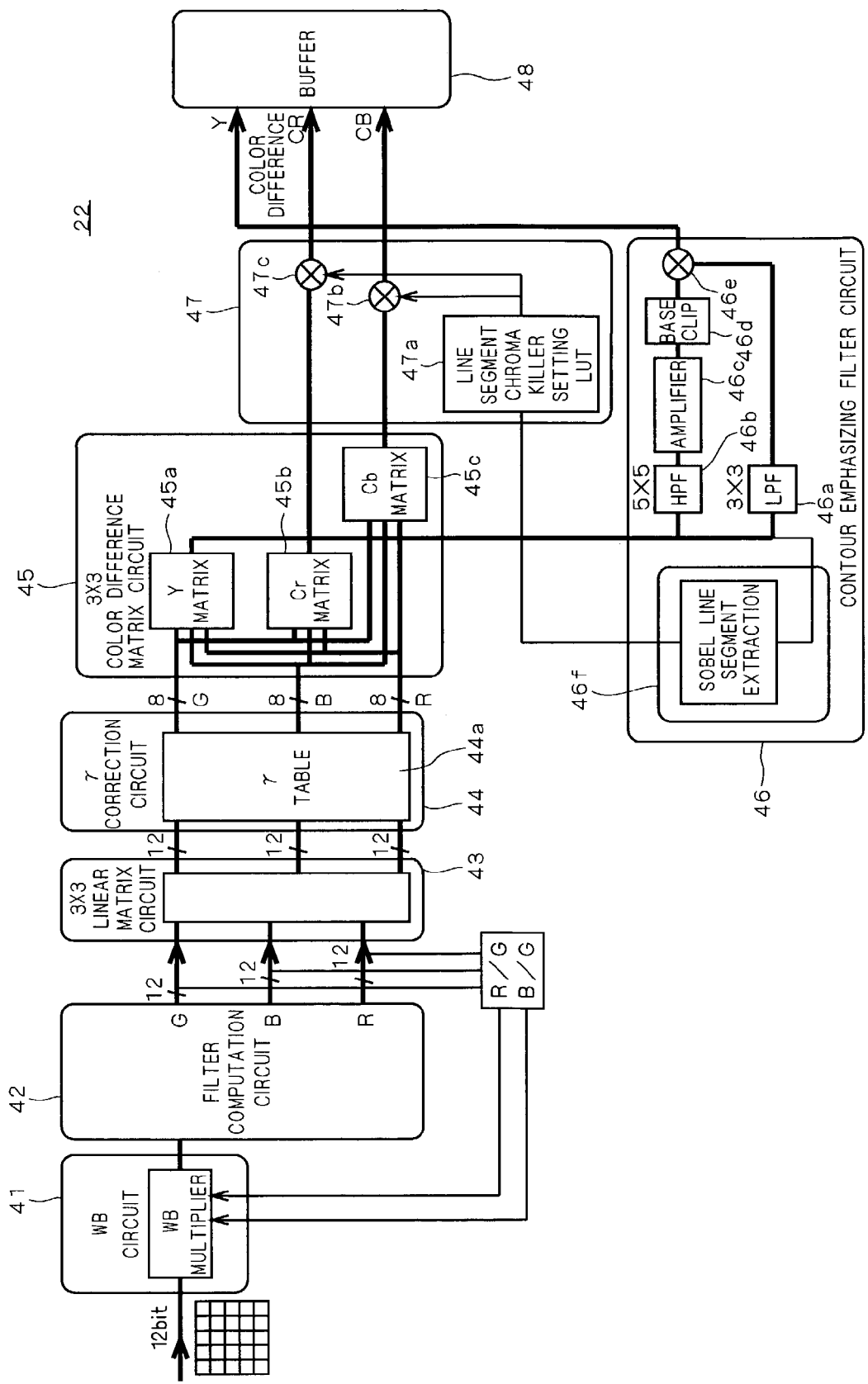
FIG. 3 is a block diagram showing an example of the detailed configuration of an image processing unit.

FIG. 3 is a block diagram showing an example of the detailed configuration of the image processing unit 22. In the image processing unit 22, an image signal obtained from the image capturing device 21 is inputted to a WB (white balance) circuit 41 where level conversion of R, G and B is performed, thereby adjusting white balance.

After the adjustment of white balance, the image signal is inputted to a filter computation circuit 42. By filter computation using a filter, a color interpolating process and also a chromatic aberration correcting process for correcting a chromatic aberration caused by the image capturing optical system 31 are performed on each pixel.

Since each pixel has information of the primary color component of only one of R, G and B, the color interpolating process estimates information of the other primary color components dropped in each pixel on the basis of values of peripheral pixels. By the color interpolating process, information of 12 bits of each of R, G and B is given to each pixel.

Generally, in the color interpolating process, a filter 201 having filter coefficients as shown in FIG. 5 is applied. By performing the filter computation while selecting a filter coefficient from the filter 201 in accordance with a color component to be interpolated of the pixel to be processed, the information of the dropped color components of the pixel can be obtained by being estimated from color components of the peripheral pixels. Filter coefficient can be set in various well-known ways. By way of example, the details of setting of filter coefficients of the filter 201 and the filter action are disclosed in the Japanese Patent Application Laid-Open No. 2000-287219.

The chromatic aberration correcting process is a process for correcting a chromatic aberration caused by the image capturing optical system 31 and is to correct a deviation between the image formation position of the G component and that of each of the R and B components, which is conspicuous particularly in an image peripheral portion.

Generally, in the chromatic aberration correcting process, an asymmetric filter 202 in which filter coefficients are distributed in an unbalanced manner as shown in FIG. 6 is applied. The filter 202 has a filter structure for correcting a chromatic aberration of the case where the image formation position of the R component is deviated to the right upper direction by 1.5 pixels from the G component. Information of the R component regarding a pixel to be processed (pixel in the center of the filter) can be estimated from four pixels positioned in the right upper direction. In other words, the filter 202 has the function of moving a pixel signal of which image formation position was moved by a chromatic aberration to the center of the image. The filter 202 is a filter capable of correcting a chromatic aberration by moving a pixel signal. The details of setting of filter coefficients of the filter 202 and the filter action are disclosed in Japanese Patent Application Laid-Open No. 5-3568 (1993) (Patent Literature 1). Such a filter 202 is obtained for each of the R and B components.

In the filter computation circuit 42, filter computation is performed by using a filter 203 as shown in FIG. 7 obtained by combining the filter 201 of FIG. 5 and the filter 202 of FIG. 6 by convolution computation or the like in order to simultaneously perform the color interpolating process and the chromatic aberration correcting process. The filter applied in the filter computation circuit 42 is changed for each pixel on the basis of an instruction from the control unit 25. Consequently, the filter computing circuit 42 is constructed so as to transmit position information of a pixel to be processed is notified to the control unit 25. On the basis of the position information, the control unit 25 determines a filter (filter obtained by combining the filter for color correcting process and the filter for correcting chromatic aberration) adapted to the process on the pixel with respect to each of the R component and the B component, and supplies the filter to the filter computing circuit 42. A method of determining a filter applied in the filter computing circuit 42 in the control unit 25 will be described later.

After the color interpolating process and chromatic aberration correcting process are performed in the filter computing circuit 42, each of pixel signals (R, G and B) is subjected to a predetermined correcting process in a linear matrix circuit 43 and, the resultant is inputted to a γ correction circuit 44. In the γ correction circuit 44, the pixel signals (R, G and B) are corrected in accordance with reproduction characteristics of a display with a γ correction table (RGB gamma LUT) 44a. Further, a 12-bit signal of each pixel is compressed to an 8-bit signal in the γ correction circuit 44.

Then, the pixel signal (R, G and B) compressed to 8 bits is inputted to a color difference matrix circuit 45. The color difference matrix circuit 45 has a Y matrix 45a, a Cr matrix 45b and a Cb matrix 45c matrixes for conversion, and a color space having the primary color components of R, G and B is converted into a color space having a luminance component (Y) and color difference components (Cr and Cb).

The luminance signal Y outputted from the color difference matrix circuit 45 is inputted to a contour emphasizing filter circuit 46. In the contour emphasizing filter circuit 46, the luminance signal Y is split to three signals. One of the three split luminance signals Y passes through an HPF (High-Pass Filter) 46b, one of them passes through an LPF (Low-Pass Filter) 46a, and the other is inputted to a line segment extracting circuit 46f.

From the luminance signal Y passed through the HPF 46b, a high frequency component is detected. The detected high frequency component is inputted to an amplifier 46c where it is amplified. Further, in a base clip 46d, only a high frequency component of a predetermined value or larger is detected and outputted.

In an adder 46e, the high frequency component of the predetermined value or larger outputted from the base clip 46d is added to the luminance signal Y passed through the LPF 46a, thereby performing contour emphasis on the luminance signal Y, and the resultant signal is outputted.

In the line segment extracting circuit 46f, by using a Sobel line segment extraction filter, a line segment component is extracted from the luminance signal Y. The luminance signal Y inputted to the line segment extracting circuit 46f is stored in a buffer (not shown). On the basis of the luminance signal Y stored in the buffer, a line segment extracting process of a pixel to be processed is performed. For example, the line segment extraction filter is expressed by a matrix form of three rows and three columns, and the line segment extracting process is performed by using the luminance signal Y of the target pixel and the luminance signals Y of eight pixels adjacent to the target pixel. Therefore, at least the luminance signals Y of nine pixels have to be stored in the buffer. With respect to each of the luminance signals Y of nine pixels in the three rows and three columns, by performing a pattern matching with the line segment extraction filter, whether the target pixel is a line segment component or not is determined. If the target pixel is a line segment component, the detection level of the line segment component is detected. As concrete processes in the line segment extracting circuit 46f, for example, the processes described in Japanese Patent Application Laid-Open No. 2002-209224 (Patent Literature 3) can be applied.

After the line segment extracting circuit 46f extracts the line segment component, position information of the pixel determined as a line segment component and the detection level of the line segment component in the pixel are inputted to a line segment chroma killer circuit 47.

The line segment chroma killer circuit 47 performs a suppressing process of a color difference signal (in the following description, electric signals of color difference components are properly expressed as color difference signals Cr and Cb) for the color difference components Cr and Cb on the basis of the detection level of an inputted line segment component. Specifically, the line segment chroma killer circuit 47 obtains the degree of suppression of the color difference signals Cr and Cb by referring to a line segment chroma killer setting lookup table (line segment chroma killer setting LUT) 47a on the basis of the detection level of an inputted line segment component, and performs a process of suppressing the color difference signals Cr and Cb according to the degree of suppression by multipliers 47b and 47c. As concrete processes in the line segment chroma killer circuit 47, for example, processes disclosed in Japanese Patent Application Laid-Open No. 2002-209224 (Patent Literature 3) can be applied. In the line segment chroma killer circuit 47, the degree of suppression control is changed according to the detection level of the line segment component, and an image process is performed so that an output image does not become unnatural.

An image signal constructed by the luminance signal Y subjected to the contour emphasizing process and the color difference signals Cr and Cb subjected to the suppression control, which is outputted by the process is temporarily stored in a buffer 48. As shown in FIG. 1, at the time of displaying an image, an image signal is outputted from the buffer 48 to the display unit 24. At the time of recording an image, an image signal is outputted from the buffer 48 to the image memory 23. For example, when an image is displayed, the image signal stored in the buffer 48 is converted to a predetermined video signal, and the video signal is outputted. When an image is recorded, a predetermined compressing process such as JPEG encoding is performed on the image signal stored in the buffer 48, and the compressed image signal is outputted.

A process of specifying a filter in the control unit 25 will now be concretely described.

As shown in FIG. 4, in the case where the image capturing optical system 31 is under an image capturing condition, the chromatic aberration 101 of the R component with respect to the G component can be preliminarily specified according to the characteristics of the image capturing optical system 31 by optical simulation or actual measurement. An approximation function 102 for approximating the actual chromatic aberration 101 of the R component in the case where the image capturing optical system 31 is under the certain image capturing conditions is preset in the control unit 25 (see FIG. 4). For example, in the case of approximating the approximation function 102 by a cubic function, when the distance from the center of an image (position coinciding with the center of the optical axis L) is set as "r" and a deviation amount between the R component and the G component in the distance "r" is set as f(r), the approximation function 102 can be expressed as follows.

$$f(r)=ar^3+br^2+cr+d \qquad \text{Equation 1}$$

In equation 1, a, b, c and d are coefficients of approximation function and are values determined by the image capturing conditions of the image capturing optical system 31. The coefficients a, b, c, and d are prestored in the memory 27 for each of different image capturing conditions.

FIG. 8 is a diagram showing an example of the relation between the image capturing conditions and the coefficients a, b, c and d stored in the memory 27. As shown in FIG. 8, the coefficients a, b, c and d of the approximation function 102 vary according to the image capturing conditions specified by the focal length, photographing distance and f-number. When the image capturing conditions are determined, each of the coefficients a, b, c and d is specified accordingly. When the position of a pixel to be processed differs, the relation as shown in FIG. 8 also becomes different. Consequently, the relationship between the image capturing conditions and the approximation function 102 is stored for each pixel in the memory 27.

The B component is processed in a manner similar to the R component. Specifically, light of the B component is deviated in the direction opposite to the direction of deviation of the R component when the G component is used as a reference. Consequently, with respect to the B component, the relation between the image capturing conditions and the approximation function is stored in signs opposite to those in the case of the R component into the memory 27 as shown in FIG. 9.

Figure 10:
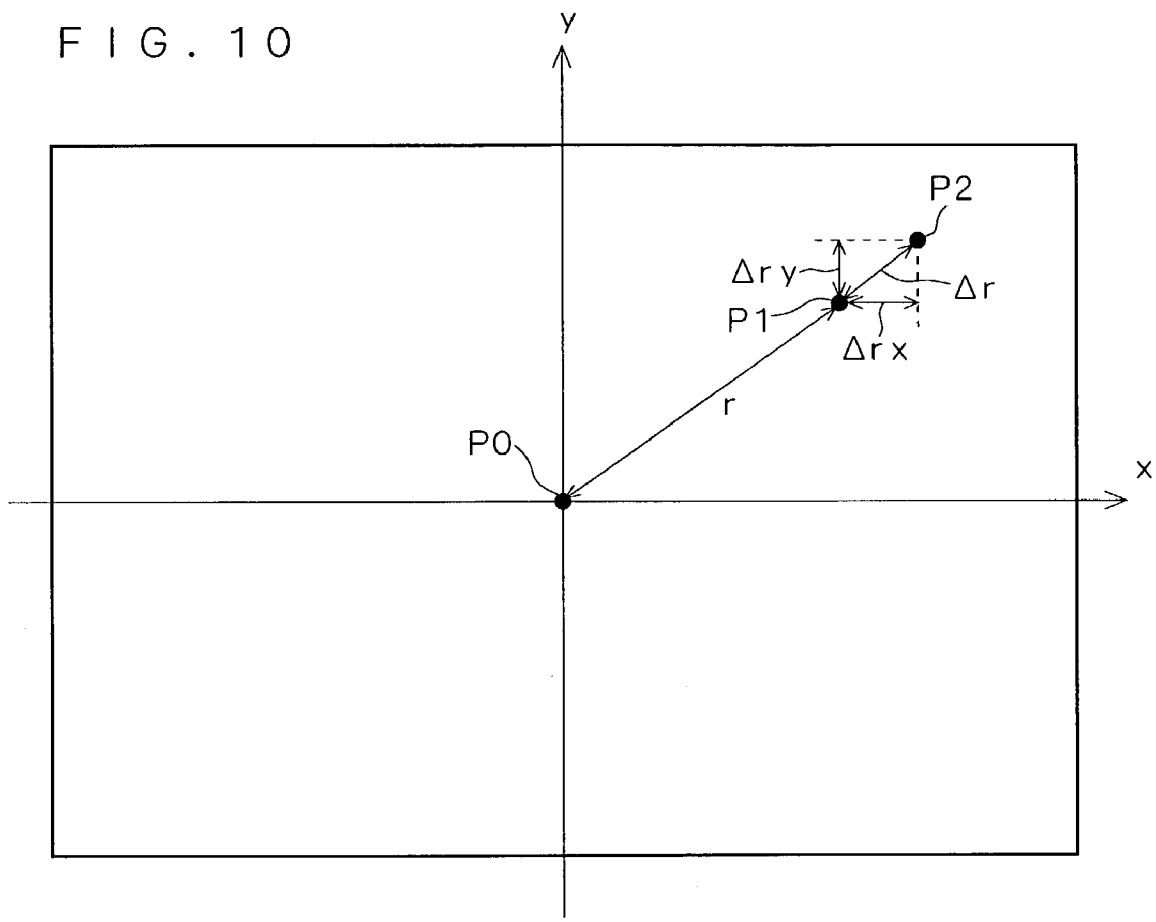
FIG. 10 is a diagram showing an image plane of an image obtained from the image capturing device.

FIG. 10 is a diagram showing an image plane of an image obtained from the image capturing device 21 and shows a case where the center of the image coincides with the center of the optical axis L. As shown in FIG. 10, when the center P0 of an image is set as a reference (0, 0), the X-axis is determined in the horizontal direction and the Y-axis is determined in the vertical direction. When the pixel to be processed is P1, the control unit 25 obtains position information (X, Y) of the present pixel P1 to be processed from the filter computation circuit 42, and computes the distance "r" between the center P0 of the image and the pixel P1 to be processed. That is, the distance "r" is obtained by computing the following equation.

$$r=\sqrt{(X^2+Y^2)} \qquad \text{Equation 2}$$

The control unit 25 reads out the coefficients a, b, c and d according to the image capturing conditions from the memory 27 and executes computation by substituting the distance "r" for Equation 1, thereby obtaining the deviation amount $\Delta r=f(r)$. It is known that by executing such computation, as shown in FIG. 10, light of the R component in the pixel P1 to be processed is moved to a pixel position P2 by a chromatic aberration.

When movement components parallel to the X-axis and Y-axis are obtained on the basis of the movement amount $\Delta r$ to the pixel position P2, a movement component $\Delta rx$ parallel to the X-axis can be expressed as follows.

$$\Delta rx=\Delta r \cdot X/r \qquad \text{Equation 3}$$

A movement component $\Delta ry$ parallel to the Y-axis can be expressed as follows.

$$\Delta ry=\Delta r \cdot Y/r \qquad \text{Equation 4}$$

X in the right side of Equation 3 denotes an X coordinate of the pixel P1 to be processed and Y in the right side of Equation 4 denotes a Y coordinate of the pixel P1 to be processed.

Therefore, from the positional information (X, Y) of the pixel P1 to be processed, the deviation amount $\Delta r$ of the image formation position due to chromatic aberration is obtained and, further, the X component ($\Delta rx$) and the Y component ($\Delta ry$) of the deviation amount $\Delta r$ can be derived. At the time of obtaining a signal value of the R component of the pixel P1 to be processed, by referring to information of the pixel P2 in a position deviated from the position (X, Y) of the pixel P1 to be processed by $\Delta rx$ in the X direction and $\Delta ry$ in the Y direction, a chromatic aberration can be corrected properly.

The filter 202 shown in FIG. 6 shows a case where each of the deviation amounts due to the chromatic aberration in the X-axis and the Y-axis is 1.5 pixels by the computation as described above. Specifically, since a pixel having proper information does not exist in the position moved from the pixel P1 to be processed in both of the X direction and the Y direction each by 1.5 pixels in the image plane, the filter of FIG. 6 is constructed to generate information of the pixel P1 to be processed from information of four pixels positioned around the pixel P1 to be processed.

That is, generally, the control unit 25 determines a filter for correcting chromatic aberration so as to generate information of the pixel P1 to be processed by referring to information of pixels in a deviated position in accordance with the deviation amounts in the X and Y directions.

Further, the control unit 25 executes convolution computation or the like on the basis of the filter 201 for processing color interpolation process (see, for example, FIG. 5) prestored in the memory 27 and the filter 202 for correcting chromatic aberration determined as described above (see, for example, FIG. 6), thereby generating the filter 203 (see, for example, FIG. 7) for simultaneously executing the color interpolating process and the chromatic aberration correcting process. The filter 203 is outputted to the filter computing circuit 42 in the image processing unit 22.

At the time of outputting the filters for obtaining signal values of the R and B components with respect to the pixel P1 to be processed, to the filter computation circuit 42, the control unit 25 obtains the filter derived by combining the filter for color interpolating process with respect to each of the R and B components and the filter for correcting chromatic aberrations with respect to the R and B components. With respect to the G component, it is regarded in the present preferred embodiment that no chromatic aberration occurs. Consequently, the filter for color interpolating process with respect to the G component is output as it is to the filter computing circuit 42.

The filter computation circuit 42 performs filter computation by applying the filters supplied from the control unit 25. Particularly, at the time of obtaining signal values of the R component and the B component of the pixel P1 to be processed, the color interpolating process and the chromatic aberration correcting process are concurrently performed.

Figure 11:
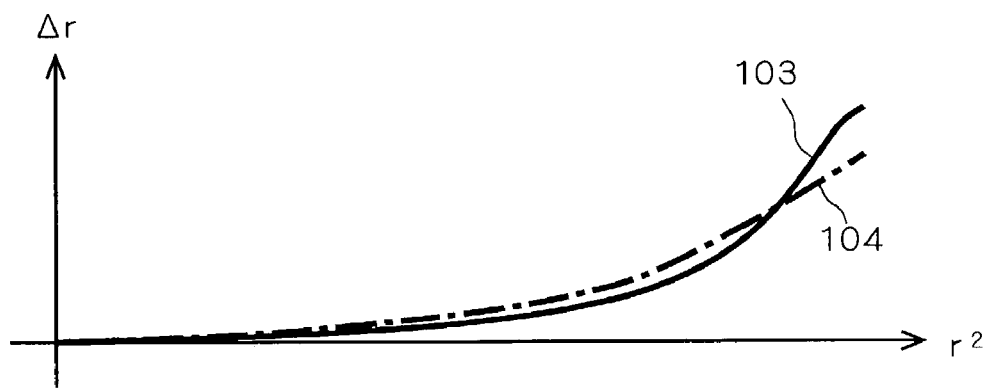
FIG. 11 is a diagram showing an example of a chromatic aberration characteristic in the case where the square of distance is an argument.

Although the case where the approximation function 102 is expressed by a cubic function using the distance "r" as an argument has been described above, alternately, the approximation function 102 may be expressed by a cubic function using the square ($r^2$) of distance as an argument. FIG. 11 is a diagram showing an example of an aberration characteristic in the case where a distance $r^2$ is an argument. Even when the distance $r^2$ is an argument as shown in FIG. 11, a chromatic aberration 104 of the R component becomes almost the same form as that of the chromatic aberration 101 in FIG. 4. As shown in FIG. 11, an approximation function 103 is defined by setting the square ($r^2$) of the distance as an argument. For example, the approximation function is specified as follows.

$$f(r)=a(r^2)^3+b(r^2)^2+c(r^2)+d \qquad \text{Equation 5}$$

In this case, at the time of obtaining an argument from position information (X, Y) of the pixel P1 to be processed, it becomes unnecessary to perform root computation as shown in Equation 2 and an argument can be obtained efficiently.

As described above, in the image capturing apparatus 1 of the present preferred embodiment, the chromatic aberration correcting process of correcting chromatic aberration caused by the image capturing optical system 31 and the color interpolating process of interpolating a dropout color component of each pixel are concurrently performed on image signals obtained from the image capturing device 21. Thus, chromatic aberration correction can be made function at high precision. That is, when the color interpolating process is performed prior to the chromatic aberration correction as in the conventional technique, an influence of chromatic aberration is exerted on peripheral pixels, so that excellent chromatic aberration correction cannot be performed. However, by performing the color interpolating process and the chromatic aberration correction concurrently, such a problem does not occur and the chromatic aberration correction can be made excellently. Since the chromatic aberration is corrected by the image process, the image capturing optical system 31 is not burdened with severe design conditions and the flexibility in designing of the image capturing optical system 31 is improved.

The image capturing apparatus 1 of the present preferred embodiment is constructed so that each of the pixels in the image capturing device 21 detects one of the color components of the three primary colors of R, G and B. The image processing unit 22 performs, as the chromatic aberration correcting process, different filter computations for at least two color components of the three primary colors, thereby performing the process of moving pixel signals of at least two color components to the center of an image. Specifically, by performing the filter computation with a filter adapted to each of the R and B components, a chromatic aberration in the case of using the G component as a reference is corrected. Consequently, without making design of a high order for the image capturing optical system 31, a chromatic aberration can be excellently corrected by the conventionally known image processing computation referred to as filter computation. Thus, a chromatic aberration can be corrected relatively easily.

The image processing unit 22 of the image capturing apparatus 1 is constructed to perform the filter computation with, as a filter applied for filter computation, a filter having coefficients obtained by combining filter coefficients for performing the color interpolating process and filter coefficients for moving a pixel signal (that is, filter coefficients for performing the chromatic aberration correcting process). Therefore, the color interpolating process and the chromatic aberration correcting process can be performed concurrently.

The image capturing apparatus 1 of the present preferred embodiment stores a plurality of filters for correcting chromatic aberrations caused by the image capturing optical system 31 in the memory 27, applies an approximation function according to the position of a pixel to be processed to thereby specify a filter applied to chromatic aberration correction from the plurality of filters stored in the memory 27, and performs chromatic aberration correction on an image obtained from the image capturing device 21 by using the specified filter. Consequently, it is unnecessary to execute complicated calculation for movement in order to correct a chromatic aberration, and a chromatic aberration can be corrected by relatively easy filter computation.

The image capturing apparatus 1 of the present preferred embodiment stores a parameter for approximating a chromatic aberration caused by the image capturing optical system 31 into the memory 27, obtains a parameter from the memory 27 in accordance with the position of a pixel to be processed and the image capturing conditions at the time of photographing of the image capturing optical system 31, executes computation with the approximation function 102, thereby estimating a deviation amount of the chromatic aberration of the image capturing optical system 31. The chromatic aberration correction on an image obtained from the image capturing device 21 is carried out in accordance with the estimated deviation amount. Therefore, since the chromatic aberration is specified by the approximation function 102, as compared with the case of registering all of patterns of the chromatic aberrations caused by the image capturing optical system 31 in the memory 27, the amount of information to be stored in the memory 27 can be reduced and, accordingly, the storage capacity of the memory 27 can be reduced. As a result, reduction in the cost and size of the image capturing apparatus 1 can be realized.

Since the approximation function 102 is an approximation function using the distance "r" from the center of an image of a pixel to be processed as an argument, the amount of parameters stored in the memory 27 can be reduced. For example, in the case of storing parameters for each of the position coordinates (X, Y) of the pixel P1 to be processed, parameters have to be specified with respect to all of coordinates in the image plane. By using the distance "r" from the center of an image as an argument as in the present preferred embodiment, the same parameter can be applied to pixels in equal distances from the center of an image, so that the storage capacity of the memory 27 can be reduced.

By expressing the approximation function 102 by an approximation function of which argument is the square of the distance "r" from the center of an image of a pixel to be processed, computation efficiency is improved, and chromatic aberration correction can be performed efficiently.

Further, the image capturing apparatus 1 of the present preferred embodiment can change parameters for performing chromatic aberration correction in accordance with image capturing conditions so that proper chromatic aberration correction can be conducted even in the case where the image capturing conditions (focal length, photographing distance, f-number and the like) of the image capturing optical system 31 are changed.

Although the case where the control unit 25 obtains a filter applied in the image processing unit 22 has been described in the present preferred embodiment, the above-described filter determining function of the control unit 25 may be realized by the image processing unit 22.

2. Second Preferred Embodiment

A second preferred embodiment will now be described. The configuration of the image capturing apparatus 1 of the second preferred embodiment is similar to that in the first preferred embodiment.

In the first preferred embodiment, the case where the control unit 25 executes computation based on the approximation function on each of the R and B components has been described. However, since the wavelength of the B component and that of the R component have a reverse relation, when the G component is set as a reference, the chromatic aberration which occurs in the B component often appears on the side opposite to the chromatic aberration which occurs in the R component. In the present preferred embodiment, therefore, the case of obtaining the parameter of the B component from the parameter of the R component without separately storing the parameter of the B component will be described.

Figures 12, 13:
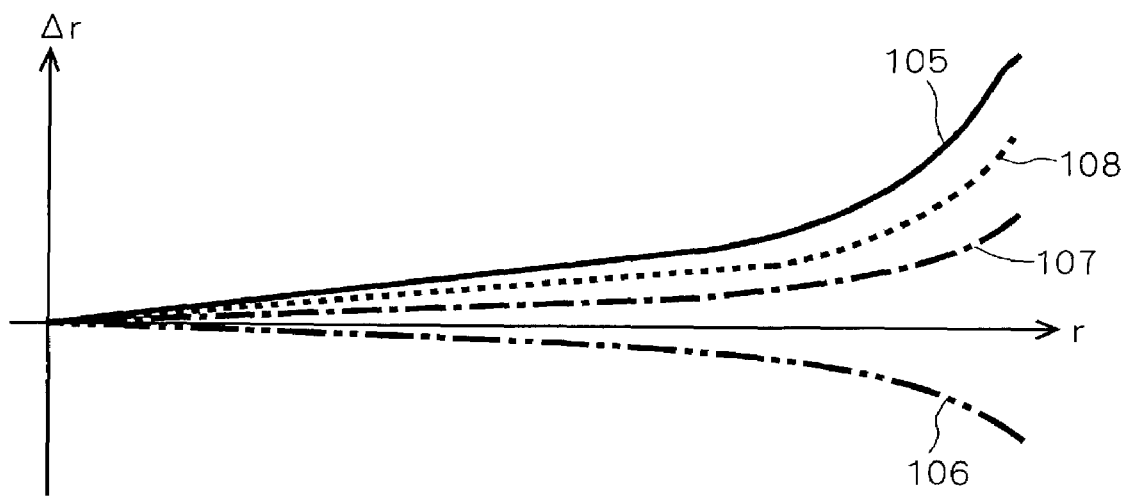
FIG. 12 is a diagram showing a chromatic aberration characteristic by the image capturing optical system.
FIG. 13 is a diagram showing an example of a filter of a B component obtained from the filter of FIG. 7.

FIG. 12 is a diagram showing a chromatic aberration characteristic caused by the image capturing optical system 31. A chromatic aberration 105 of the R component appears on the side opposite to a chromatic aberration 106 of the B component. The chromatic aberration 106 of the B component becomes a chromatic aberration 107 when the diagram is folded around the r-axis as a center. In the present preferred embodiment, an approximation function 108 obtained by a weighted average between the chromatic aberrations 105 and 107, as an approximation function which can be applied to both the R and B components is approximated with a cubic function. The degree of weighted average is preset so that, for example, the ratio of the chromatic aberration 105 of the R component becomes 0.5 to 1 in consideration of a coloring characteristic and the like of the image capturing optical system 31. The coefficients (the parameters of a, b, c and d) of the approximation function 108 which is set in such a manner are stored in the memory 27. With such a configuration, it becomes unnecessary to store independent parameters of the R and B components in the memory 27, so that the storage capacity of the memory 27 can be reduced.

When the control unit 25 obtains a filter to be outputted to the filter computing circuit 42 with respect to the R component, the parameters stored in the memory 27 are obtained and computation based on the approximation function 108 is executed, thereby determining a chromatic aberration (deviation amount) with respect to the pixel P1 to be processed, and the filter 203 for output (see FIG. 7) is determined on the basis of the deviation amount.

In the case where the pixel P1 to be processed is the same by applying the same approximation function 108 to both of the R and B components, a chromatic aberration (deviation amount) obtained by computation based on the approximation function 108 becomes the same value. Consequently, when the filter 203 for output as shown in FIG. 7 is obtained with respect to the R component, if a filter having filter coefficients symmetrical with respect to the position of the pixel P1 to be processed (that is, the filter center position) as a reference is generated as the filter 203 of FIG. 7, the control unit 25 can obtain the filter for output which can be applied to the B component.

FIG. 13 is a diagram showing an example of the filter of the B component obtained from the filter of FIG. 7. As shown in FIG. 13, when the filter 203 for output as shown in FIG. 7 is obtained with respect to the R component, by moving filter coefficients symmetrically with respect to the filter center position as a reference, the filter 204 for output shown in FIG. 13 can be obtained.

Therefore, the image capturing apparatus 1 of the present preferred embodiment specifies an approximation function which can be applied to the chromatic aberrations of both the R and B components, generates a filter applied to a filter computation by executing computation based on the approximation function 108 with respect to either the R or B component, and moves the filter coefficient with respect to the other component symmetrically without performing the computation based on the approximation function, thereby generating a filter applied to the filter computation. Therefore, it is unnecessary to store parameters for generating filters in the memory 27 with respect to the other color component, so that the storage capacity of the memory 27 can be reduced. By executing the computation on one of the color components, for the other color component, a final filter can be generated without performing complicated computation. Thus, computation efficiency for generating filters can be improved.

3. Third Preferred Embodiment

A third preferred embodiment will now be described. The configuration of the image capturing apparatus 1 in the third preferred embodiment is also similar to that in the first preferred embodiment.

In the first and second preferred embodiments, a deviation amount of a chromatic aberration is obtained by performing computation with an approximation function by using the distance "r" from the image canter of the pixel P1 to be processed as an argument, and the filter applied to the filter computing circuit 42 is obtained on the basis of the deviation amount. However, the approximation function is obtained by optical characteristics of the image capturing optical system 31, so that the approximation function can be preliminarily applied to each of pixels positions in an image plane and computation can be executed. In the third preferred embodiment, therefore, a case of prestoring a deviation amount obtained by applying an approximation function to each of the pixel positions in an image plane in a lookup table in the memory 27 in order to improve computation efficiency will be described.

The argument "r" in Equation 1 can be unconditionally obtained from the pixel position (X, Y) as in Equation 2. Since each of the coefficients a, b, c and d in Equation 1 is predetermined by the image capturing conditions of the image capturing optical system 31, deviation amounts $\Delta rx$ and $\Delta ry$ in the X and Y directions derived by applying the approximation function are preliminarily computed, and the relation is stored in the memory 27.

Figures 14, 15:
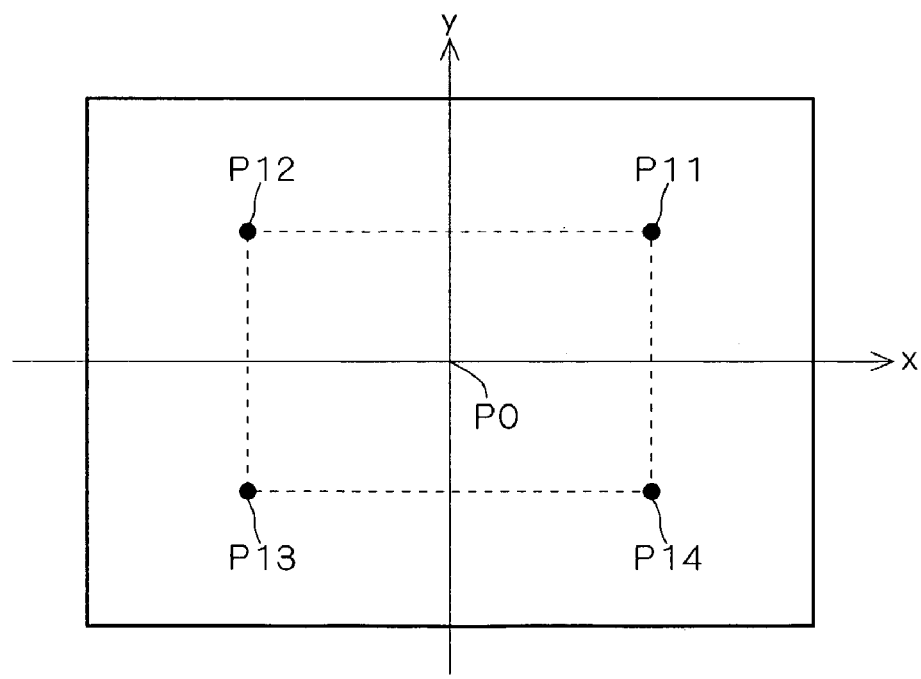
FIG. 14 is a diagram showing an example of a lookup table stored in a memory.
FIG. 15 is a diagram showing an image plane.

FIG. 14 is a diagram showing an example of a lookup table 301 stored in the memory 27. As shown in FIG. 14, when the position coordinates (X, Y) of a pixel to be processed are designated from an input address, the lookup table 301 is constructed so as to output movement amounts (deviation amounts) Δrx and Δry due to chromatic aberrations corresponding to the pixel position.

By setting the lookup table 301 as shown in FIG. 14 for each image capturing condition, a movement amount due to a chromatic aberration under a specific image capturing condition can be promptly obtained without performing a computing process. By setting the lookup table 301 with respect to each of the R and B components, the movement amount due to a chromatic aberration under a specific image capturing condition can be promptly obtained without performing a computing process with respect to each of the R and B components.

As a result, time required to determine a filter to be finally outputted to the filter computation circuit 42 is shortened, so that efficient filter computation is executed.

In this case, by setting the image center coinciding with the center of the optical axis L as the coordinate origin, the amount of information to be stored in the memory 27 can be reduced. FIG. 15 is a diagram showing an image plane. As shown in FIG. 15, an XY coordinate system in which the image center P0 coincides with the center of the optical axis L and which specifies a pixel position by using the image center P0 as the origin is set.

Attention is paid to a pixel P11 included in a first quadrant in the coordinate system, and it is assumed that the coordinate position of the pixel P11 is (X1, Y1). The pixel position of a pixel P12 symmetrical to the pixel P11 with respect to the Y-axis is (-X1, Y1), the pixel position of a pixel P13 symmetrical to the pixel P12 with respect to the X-axis is (-X1, -Y1), and the pixel position of a pixel P14 symmetrical to the pixel P13 with respect to the Y-axis (the pixel is also symmetrical to the pixel P11 with respect to the X-axis) is (X1, -Y1). The four pixels P11, P12, P13 and P14 are in the equidistance from the pixel center P0. The absolute value of the deviation amount in the X direction and that in the Y direction in the case where the pixels are pixels to be processed are equal to each other.

Specifically, when the deviation amount in the pixel P11 is (Δrx1, Δry1), the deviation amount in the pixel P12 is (-Δrx1, Δry1), and the deviation amount in the pixel P13 is (-Δrx1, -Δry1), and the deviation amount in the pixel P14 is (Δrx1, -Δry1).

Therefore, as the lookup table 301 to be stored in the memory 27, for example, it is preferable to divide an image plane into four quadrants by using the image center as a reference and store only parameters related to the first quadrant. In the case where a pixel to be processed is included in the first quadrant, the deviation amounts in the X and Y directions can be immediately obtained by referring to the lookup table 301. In the case where a pixel to be processed is positioned in any of the second to fourth quadrants in an image plane, by referring to the lookup table 301 on the basis of absolute values of coordinate values of the pixel to be processed, deviation amounts in the X and Y directions are obtained. By assigning a sign according to the coordinate position of the pixel to be processed to the deviation amount obtained, a proper deviation amount can be obtained.

In the present preferred embodiment, it is therefore preferable to store only parameters in the case where a pixel to be processed is included in the first quadrant of an image plane. When the pixel to be processed is included in a region other than the first quadrant, a proper parameter is obtained by using the parameter stored in the memory 27 and the sign is inverted in consideration of symmetry of the coordinates by using the parameters stored in the memory 27. With such a configuration, the amount of information to be stored in the memory 27 becomes ¼ of that of information with respect to the whole image plane. Thus, it can contribute to reduction in the storage capacity.

Although the case of storing the relationship between the pixel position and the deviation amount as a lookup table into the memory 27 has been described in the present preferred embodiment, the present invention is not limited to the case. For example, it is also possible to store a filter for chromatic aberration correction as a lookup table in the memory 27 in correspondence with each of the deviation amounts in the X and Y directions. In this case, the control unit 25 can determine the filter for chromatic aberration correction only by reading a filter for chromatic aberration correction from the memory 27 on the basis of the deviation amount in each of the X and Y directions and the efficiency of the computing process required to determine a filter can be increased.

As obvious from Equation 1, after the image capturing conditions are determined, the deviation amounts in the X and Y directions are unconditionally determined from a pixel position. Consequently, it is possible to preliminarily obtain the deviation amounts and store the filter for chromatic aberration correction as a lookup table in correspondence with the image capturing conditions and the pixel position into the memory 27.

With respect to each of the R and B components, a preliminarily obtained filter for output (filter obtained by combining the filter for color interpolating process and the filter for chromatic aberration correction) in correspondence with the image capturing condition and the pixel position may be stored as a lookup table into the memory 27. In this case, it is unnecessary to execute complicated computation to determine a filter for output in the control unit 25 and a filter for output can be obtained most efficiently.

In those cases as well, only filters applied for filter computation and applied to image components included in the first quadrant obtained by using the image center as a reference are stored in the memory 27. When a pixel to be processed is included in the first quadrant, a filter applied to the filter computation is immediately obtained by referring to the memory 27. On the other hand, when a pixel to be processed is not included in the first quadrant, by obtaining a filter stored in the memory 27 and performing conversion of a filter coefficient, a filter applied to the filter computation can be obtained.

Figure 16B:
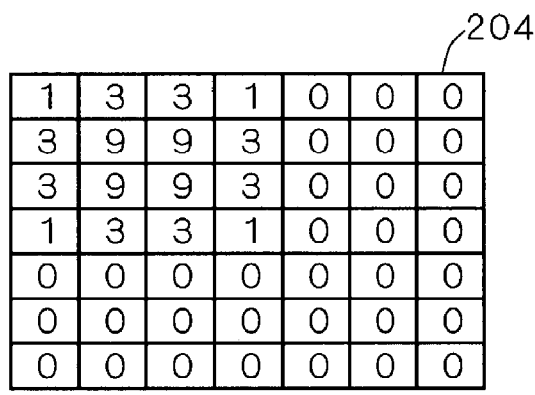
FIGS. 16A to 16D are diagrams for describing conversion of filter coefficients.
Figure 16A:
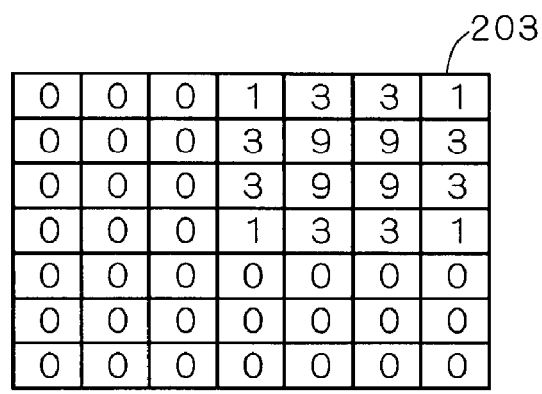
Figure 16C:
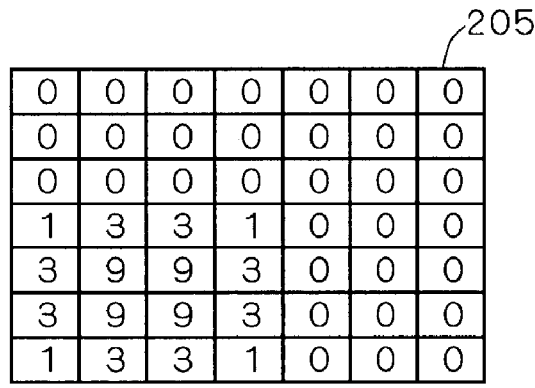
Figure 16D:
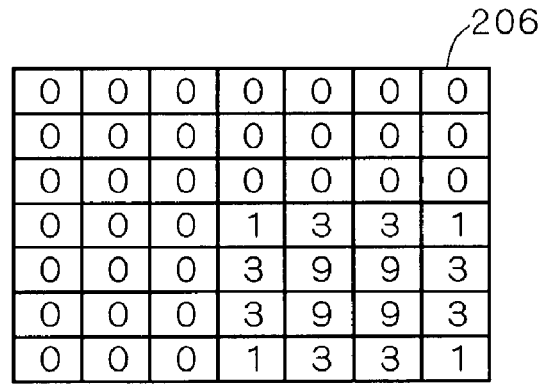

The filter coefficient conversion will be described by referring to FIGS. 16A to 16D. It is assumed that, by referring to the memory 27 with respect to the pixel P11 (see FIG. 15) included in the first quadrant of an image plane, the filter 203 as shown in FIG. 16A is obtained. In this case, the filter 203 is outputted as it is to the filter computing circuit 42. On the other hand, in the case of generating a filter for the pixel P12 (see FIG. 15) included in the second quadrant of the image plane, by referring to the memory 27, the filter 203 as shown in FIG. 16A is obtained. Consequently, the filter coefficient is moved symmetrically on the basis of the symmetry of the coordinates of the first and second quadrants, the filter coefficient is converted, thereby generating the filter 204 as shown in FIG. 16B. The control unit 25 is also constructed so as to output the filter 204 to the filter computing circuit 42. The case where a pixel exists in the third or fourth quadrant is similar to the above (for example, the pixels P13 and P14 in FIG. 15). By performing symmetrical movement of filter coefficients on the basis of symmetry of coordinates on the filter 203 obtained from the memory 27, filters 205 and 206 as shown in FIGS. 16C and 16D are generated and outputted to the filter computing circuit 42.

Since such conversion of a filter coefficient can be relatively easily performed, while suppressing time required to generate a filter, the storage capacity of the memory 27 can be effectively reduced.

In the present preferred embodiment as well, as described in the second preferred embodiment, it is also possible to store parameters of either the R or B component in the memory 27 and, for the other component, to generate a proper filter by converting the parameter obtained from the memory 27 (for example, symmetrical movement of a filter coefficient). As an example, filters in the case where the pixel to be processed is positioned in the first quadrant will be described. Only filters applied to the R component are stored in the memory 27 and a filter applied to the B component and a filter applied to the R component in the case where a pixel to be processed is positioned in the other area may be generated by converting the filter coefficient for the filter stored in the memory 27. With such a configuration, the storage capacity of the memory 27 can be reduced. Concretely, as compared with the case of storing parameters in the whole image area with respect to both the R and B components into the memory 27, the storage capacity can be reduced to ⅛.

As described above, in the image capturing apparatus 1 of the present preferred embodiment, with respect to filters applied to the filter computation, a filter applied to an image component included in the first quadrant when the image center is a reference is stored in the memory 27. In the case where a pixel signal to be processed is not included in the first quadrant, the filter stored in the memory 27 is converted, thereby obtaining a filter applied to filter computation. Consequently, it becomes sufficient to store information in which the pixel position and a filter are associated with each other with respect to only the region which is ¼ of an image plane into the memory 27. Thus, the storage capacity of the memory 27 can be reduced.

In the present preferred embodiment, with respect to filters applied to filter computation, in the case of storing only filters applied to a specific color in the three primary colors of R, G and B in the memory 27 and performing the process for a color component other than the specific color, by converting a filter stored in the memory 27, a filter adapted to the color component is obtained. Therefore, as compared with the case of storing proper filters for the R and B components of the two colors out of the three primary colors of R, G and B, the storage capacity of the memory 27 can be effectively reduced.

In the present preferred embodiment as well, the filter applied to filter computation has to be changed according to the image capturing conditions of the image capturing optical system 31. For this purpose, a lookup table is prepared for each of image capturing conditions.

4. Fourth Preferred Embodiment

A fourth preferred embodiment will now be described. In the fourth preferred embodiment as well, the configuration of the image capturing apparatus 1 is similar to that described in the first preferred embodiment.

Figures 17, 18:
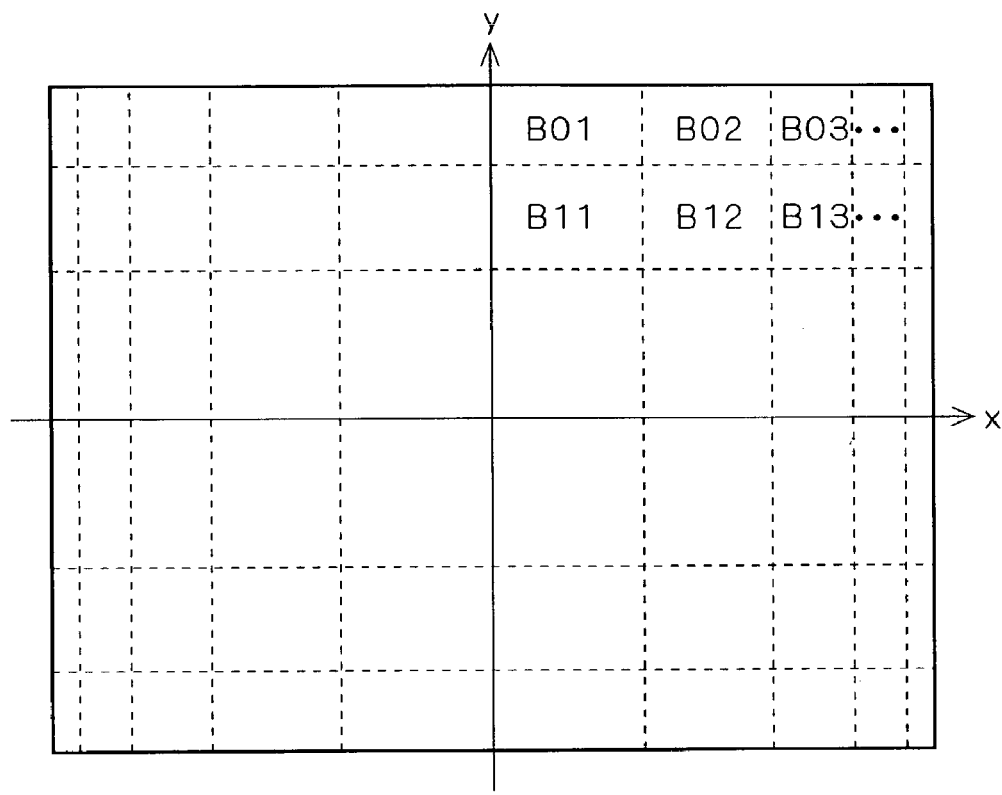
FIG. 17 is a diagram showing an example of dividing an image plane of an image obtained from the image capturing device into blocks.
FIG. 18 is a diagram showing an example of a lookup table stored in a memory.

In the fourth preferred embodiment, a method of reducing the storage capacity of the memory 27 more than the third preferred embodiment will be described. FIG. 17 is a diagram showing an image plane of an image obtained from the image capturing device 21. In the fourth preferred embodiment, as shown in FIG. 17, a plurality of blocks B01, B02, B03, . . . are specified for an image obtained from the image capturing device, and chromatic aberrations (deviation amounts) of pixels signals included in blocks are stored in the memory 27 on the block unit basis.

The control unit 25 obtains position information of the pixel P1 to be processed from the filter computing circuit 42, determines a block in which the pixel P1 to be processed is included from the plurality of blocks, and obtains a deviation amount determined for the block from the memory 27.

FIG. 18 is a diagram showing an example of a lookup table 302 stored in the memory 27 in the present preferred embodiment. As shown in FIG. 18, the lookup table 302 is constructed so that when the number of a block including the pixel to be processed is designated by an input address, the movement amounts (deviation amounts) $\Delta rx$ and $\Delta ry$ caused by chromatic aberrations corresponding to the block number are outputted.

By setting the lookup table 302 as shown in FIG. 18 for each of the image capturing conditions, the movement amount caused by a chromatic aberration under a specific image capturing condition can be promptly obtained. By setting the lookup table 302 for each of the R and B components, the movement amount caused by the chromatic aberration under the specific image capturing condition with respect to each of the R and B components can be promptly obtained without executing the computing process.

Although similar chromatic aberration corrections are applied on the block unit basis in the present preferred embodiment, it is also possible to apply similar chromatic aberration corrections within the same block to a degree that the chromatic aberration is inconspicuous. At the time of dividing an image plane into blocks, it is sufficient to make a division setting so that an actual deviation amount in each block lies within a predetermined range.

By dividing the image plane into a plurality of blocks and setting parameters stored in the memory 27 on the block unit basis, the amount of information to be stored in the memory 27 can be largely reduced, and the present invention can be excellently adapted to increase in the number of pixels of the image capturing device 21.

Since the chromatic aberration increases with distance "r" from the image center (center of the optical axis L), at the time of specifying each block, it is desirable that a block of a relatively large size be specified in a center portion of the image and the size of block decreases toward the periphery of the image as shown in FIG. 17. By employing such a block configuration, chromatic aberration correction can be made excellently function also in the peripheral portion of an image where the chromatic aberration conspicuously appears. In the center portion of an image where the chromatic aberration is inconspicuous, a large area to which the same parameter is applied can be assured. Thus, an amount of information to be stored in the memory 27 can be efficiently reduced.

The control unit 25 obtains the deviation amount with respect to the pixel P1 to be processed from the memory 27, determines a filter for chromatic aberration correction on the basis of the deviation amount, and combines the determined filter with a filter for color interpolating process, thereby obtaining a filter for output. The filter for output is outputted to the filter computing circuit 42 where the filter computation is performed, and the color interpolating process and the chromatic aberration correcting process are concurrently carried out. In the filter computing circuit 42, the process of correcting the chromatic aberration which occurs in the image capturing optical system 31 is performed as a similar process on the block unit basis.

In the case where the process is performed on the block unit basis, mismatching of parameters occurs in the border of blocks, and there is the possibility that discontinuity of images is visually conspicuous in the border of the blocks. Consequently, it is more preferable to generate a parameter to be applied to filter computation by performing weighted averaging according to a pixel position by using not only the parameter of a block to be processed but also the parameters of peripheral blocks.

Figure 19:
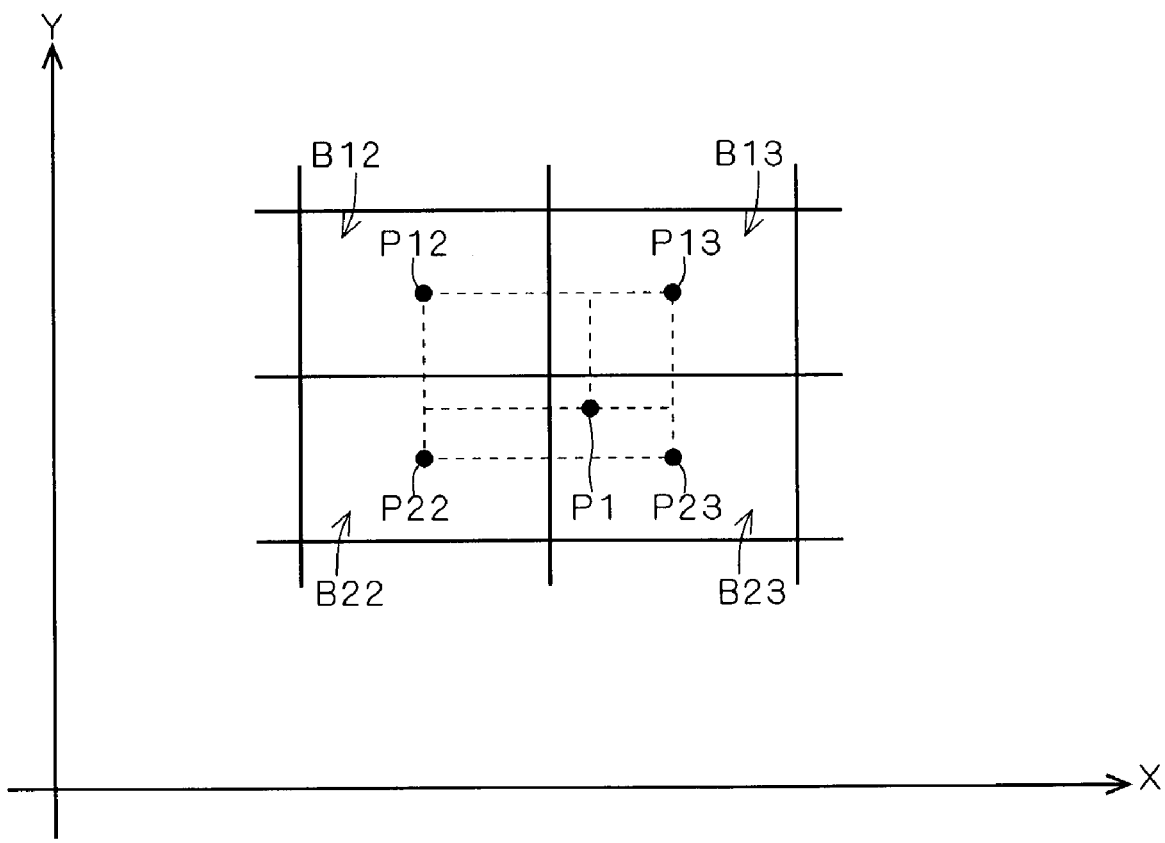
FIG. 19 is a diagram for describing concept of weighted average.

FIG. 19 is a diagram for describing the concept of weighted averaging. As shown in FIG. 19, for a block B12, the chromatic aberration (deviation amount) of a representative pixel P12 is stored in the memory 27. For blocks B13, B22 and B23, chromatic aberrations (deviation amounts) of representative pixels P13, P22 and P23 are stored in the memory 27, respectively. In this case, if the pixel P1 to be processed is positioned in the block B23 (see FIG. 19), the pixel P1 to be processed is surrounded by four representative pixels P12, P13, P22 and P23. Consequently, at the time of obtaining a deviation amount of the pixel P1 to be processed, only the deviation amount stored in the block B23 is not used. The deviation amounts stored with respect to the four blocks B12, B13, B22 and B23 positioned near the pixel P1 to be processed are read from the memory 27 and weighted averaging is performed in consideration of the positional relations between the pixel P1 to be processed and the representative pixels P12, P13, P22 and p23, thereby obtaining the chromatic aberration (deviation amount) in the pixel P1 to be processed. For the setting of weighting, for example, the technique disclosed in Japanese Patent Application Laid-Open No. 5-3568 (1993) (Patent Literature 1) can be applied.

As described above, by constructing the image capturing apparatus 1 to obtain a parameter for the pixel P1 to be processed by performing weighted averaging with the parameters stored in adjacent blocks, discontinuity in the border of blocks can be eliminated. Without deteriorating the picture quality, excellent chromatic aberration correction can be made.

Although the case where the parameter stored in the memory 27 is a chromatic aberration (deviation amount) caused by the image capturing optical system 31 has been described. However, the parameter stored in the memory 27 is not limited to the chromatic aberration but may be the filter for chromatic aberration correction applied to each block or the filter for output to be outputted to the filter computing circuit 42.

As described above, the image capturing apparatus 1 in the present preferred embodiment is constructed so that a plurality of blocks are specified for an image plane of an image obtained from the image capturing device 21, and the parameter for chromatic aberration correction applied to each block is stored in the memory 27. For an image signal obtained from the image capturing device 21 at the time of photographing, the parameter is read from the memory 27, and the process of correcting the chromatic aberration which is caused by the image capturing optical system 31 is performed on a block unit basis. Thus, chromatic aberration correction can be excellently performed while reducing the storage capacity of the memory 27.

Since blocks specified for the image plane of an image obtained from the image capturing device 21 are set so that the size decreases with distance from the center of an image, a chromatic aberration in the peripheral portion of an image can be excellently corrected while reducing the storage capacity of the memory 27.

At the time of performing the process of correcting a chromatic aberration on the block unit basis, a parameter to be applied to a peripheral block is read in accordance with the position of a pixel to be processed, a weighted parameter is obtained, and the process of correcting a chromatic aberration is performed by using the weighted parameter. Thus, images can be prevented from being discontinued at the border of blocks.

Figure 20A:
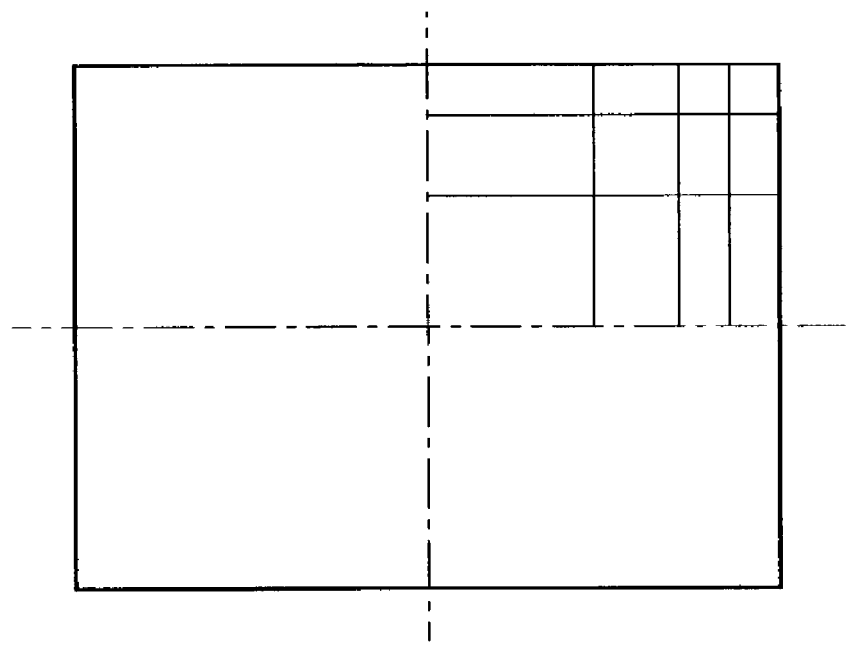
FIGS. 20A and 20B are diagrams showing an example of dividing an image plane into blocks differently with respect to R and B components.
Figure 20B:
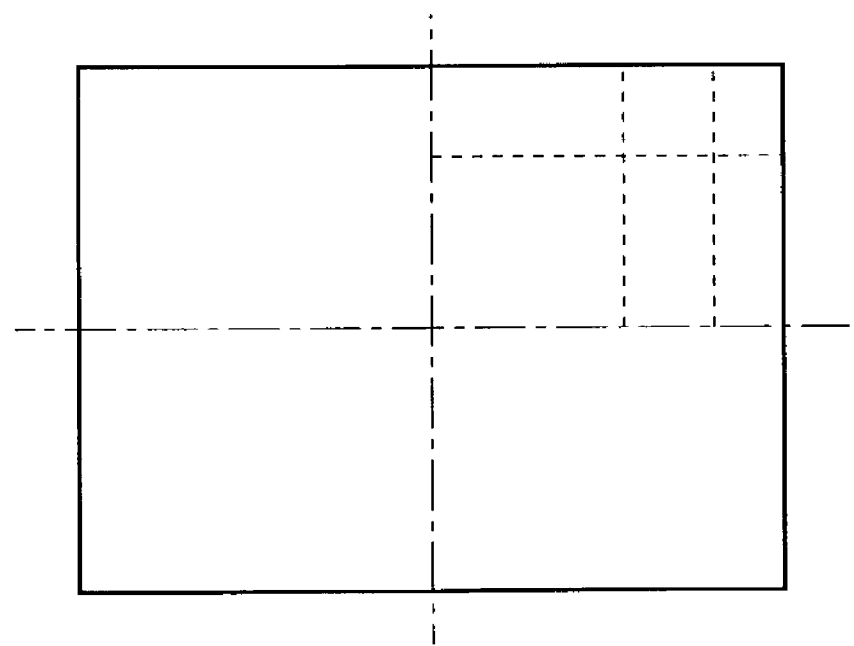

Division of an image plane into blocks may be set for, for example, each of the R and B components. FIGS. 20A and 20B are diagrams showing an example of performing different block dividing operations for the R and B components. FIG. 20A shows block division for correcting a chromatic aberration on an image of B components, and FIG. 20B shows block division for correcting a chromatic aberration on an image of R components. FIGS. 20A and 20B show that a chromatic aberration appears on the image of the B components larger than that on the image of the R components. The image plane of the B component is divided into the larger number of blocks as compared with block division of the R component. As described above, the blocks specified for the image plane obtained from the image capturing device 21 may be specified differently with respect to color components on each of which chromatic aberration correction is made. In this case, the chromatic aberration which varies according to a color component can be excellently corrected. Correction precision can be increased and, moreover, the storage capacity of the memory 27 can be reduced.

In the present preferred embodiment, the filter applied to the filter computation has to be changed according to the image capturing conditions of the image capturing optical system 31. Consequently, it is preferable to set block division and the parameter to be stored in the memory 27 be set for each image capturing condition.

At the time of storing parameters of each area divided in blocks into the memory 27, as described in the third preferred embodiment, only the part of the first quadrant of the image plane is stored in the memory 27. If a pixel to be processed is positioned in other areas, a parameter applied to the first quadrant is read to perform a converting process according to the position of the pixel to be processed, thereby generating a parameter applied to the pixel to be processed.

5. Fifth Preferred Embodiment

A fifth preferred embodiment will now be described. In the first to fourth preferred embodiments, the case where the image process is performed in the image capturing apparatus and the color interpolating process and the chromatic aberration correcting process are performed in the image process was described. In the fifth preferred embodiment, an example of the configuration in the case where an image signal obtained by the image capturing device 21 is outputted from the image capturing apparatus 1 as it is to external devices and the color interpolating process and the chromatic aberration correcting process are performed in external devices will be described.

FIG. 21 is a diagram showing the configuration of an image processing system according to the fifth preferred embodiment. The system is constructed so that data communication can be performed between an image capturing apparatus 1a and a computer 50 in a wired or wireless communication form. The image capturing apparatus la receives light from the subject entering via the image capturing optical system 31 by the image capturing device 21 and generates a color image signal of the subject. The image capturing optical system 31 and the image capturing device 21 are similar to those described in the first preferred embodiment.

A control unit 28 controls the image capturing optical system 31 and the image capturing device 21 and controls the image capturing operation in a centralized manner. Consequently, the control unit 28 can grasp the image capturing condition of the image capturing optical system 31.

An image signal generated by photoelectric conversion in the image capturing device 21 is converted into, for example, a 12-bit digital signal and the digital signal is supplied to an output unit 29. Therefore, the image signal (image data) supplied from the image capturing device 21 to the output unit 29 is a signal obtained by digitizing the signal as it is, which is outputted from the image capturing device 21 and is so-called RAW data (RAW image data). The output unit 29 generates an image file on the basis of the image signal obtained from the image capturing device 21.

Figure 22:
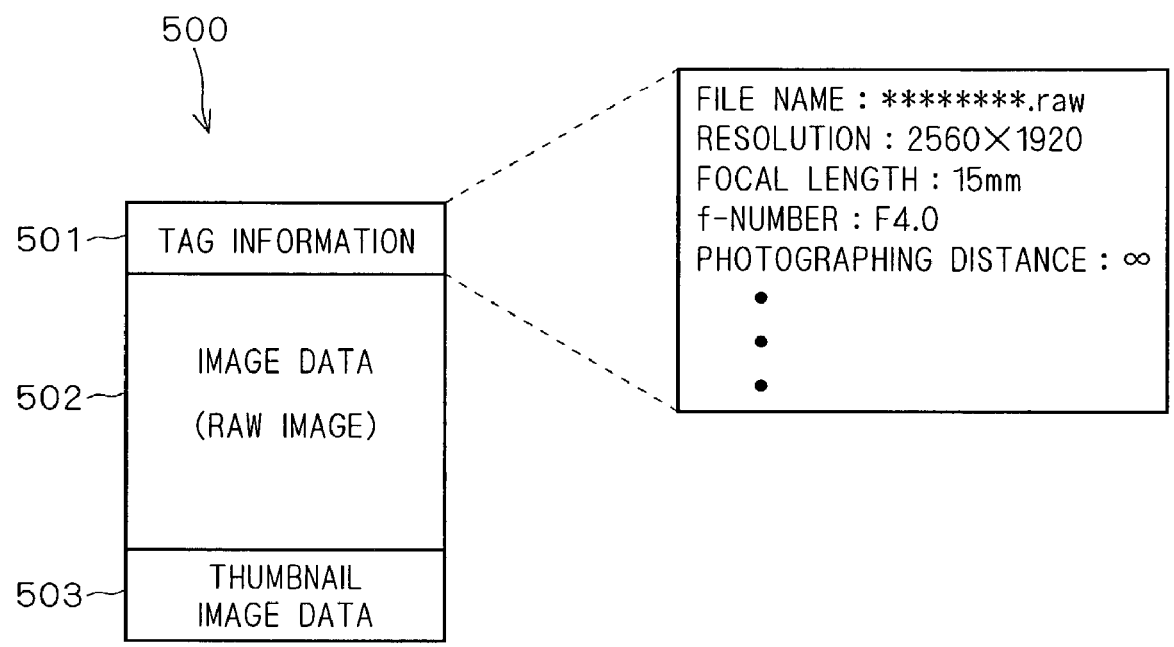
FIG. 22 is a diagram showing an example of an image file.

FIG. 22 is a diagram showing an example of an image file generated by the output unit 29. As shown in FIG. 22, an image file 500 includes tag information 501, image data 502 and thumbnail image data 503. The tag information 501 includes information regarding image capturing conditions obtained from the control unit 28 by the output unit 29. Specifically, the information such as resolution at the time of photographing of the image capturing device 21, and focal length, an f-number and photographing distance at the time of photographing of the image capturing optical system 31 is included as the tag information 501 in the image file 500. The image data 502 is an image signal (that is RAW data) inputted from the image capturing device 21. The thumbnail image data 503 is generated by the output unit 29 on the basis of the RAW data. In the present preferred embodiment, the thumbnail image data 503 is not necessarily included in the image file 500.

The output unit 29 is constructed to transmit the image file 500 as shown in FIG. 22 to the computer 50.

The computer 50 is constructed by a body 60, a display unit 51 and an operation unit 52. The display unit 51 is a display device such as a CRT or a liquid crystal display. The operation unit 52 is a device for inputting operations, such as a keyboard or a mouse.

The body 60 is constructed by a CPU 61, a storing unit 62, an input unit 63 and an input/output unit 64. The input/output unit 64 can access the recording medium 55 such as a CD-ROM to read/record information from/to the recording medium 55. Consequently, the CPU 61 can obtain a program (including an image processing program) stored in the recording medium 55 via the input/output unit 64 and execute the program.

By executing a predetermined image processing program by the CPU 61, the function of performing the chromatic aberration correcting process in the computer 50 described in the foregoing preferred embodiments is realized. That is, the CPU 61 functions as an image processing unit 61a.

The CPU 61 receives an image file from the image capturing apparatus 1a via the input unit 63 and temporarily stores the image file into the storing unit 62 such as a magnetic disk drive.

The image processing unit 61a functions and an image file as an object of an image process is read out from the plurality of image files 500 stored in the storing unit 62. While referring to tag information included in the image files 500, the chromatic aberration correcting process, color interpolating process, and the like are performed on image data (RAW data), thereby generating image data of each of the color components of R, G and B.

Specifically, the image processing unit 61a determines an image center (the center position of the light axis L) from resolution included in the tag information, and sets an image plane of the RAW image. The image processing unit 61a obtains a chromatic aberration caused by the image capturing optical system from the image capturing conditions (focal length, f-number and photographing distance) of the image capturing optical system 31 and determines a chromatic aberration correcting filter for correcting the chromatic aberration. By performing a filter computing process on the RAW image data by using the filter for chromatic aberration correction, chromatic-aberration-corrected image data is generated.

An image subjected to chromatic aberration correction is displayed on the display unit 51 or stored in the storing unit 62. Alternately, the image may be outputted from the computer 50 to an external device.

Figure 23:
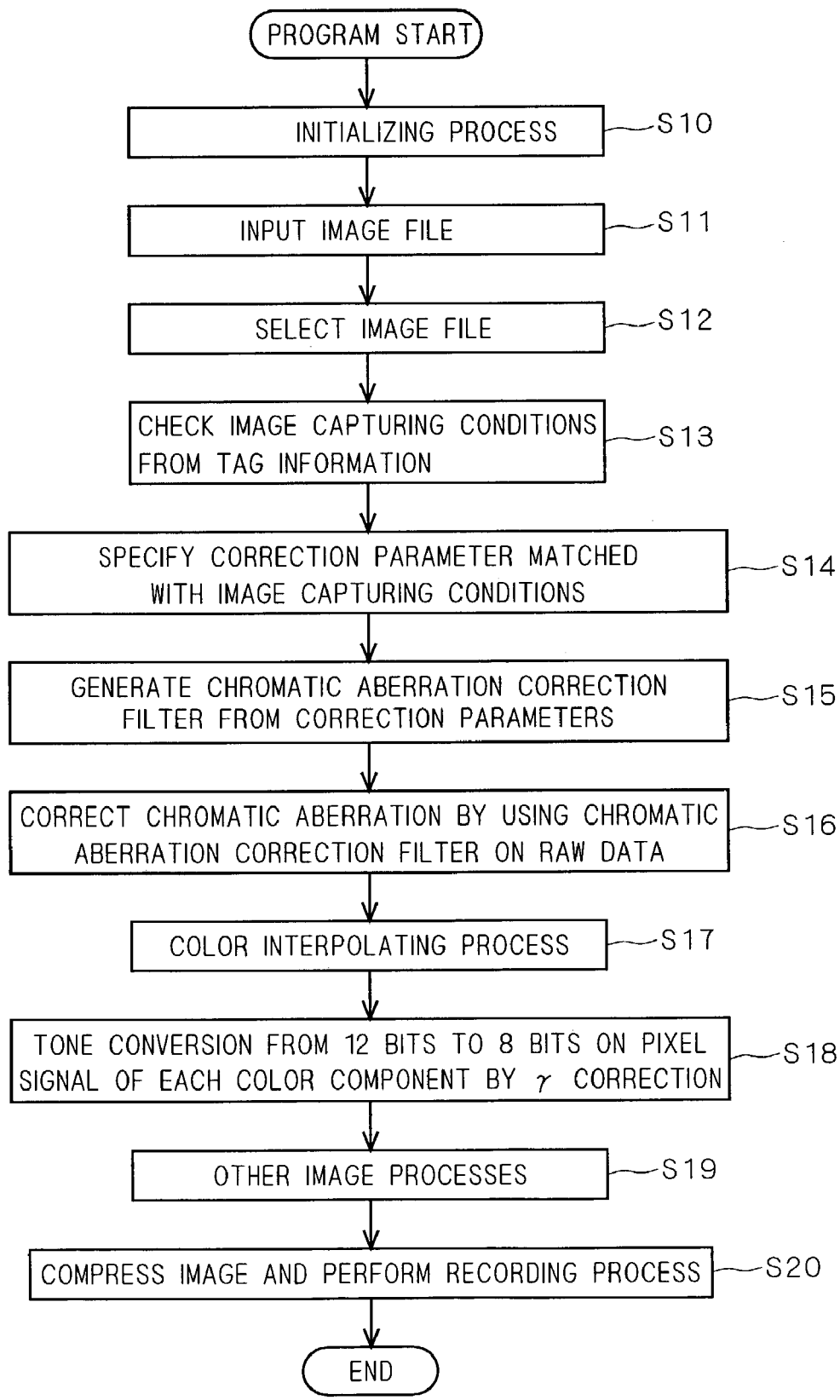
FIG. 23 is a flowchart showing a processing sequence in a computer.

FIG. 23 is a flowchart showing a processing sequence in the computer 50 constructed as described above. When the CPU 61 starts an image processing program in the computer 50, a process of initializing the components is performed (step S10). After the initializing process is finished, the computer 50 inputs an image file from the image capturing apparatus 1a (step S11). In the case of performing an image process on an image file already stored in the storing unit 62, it is unnecessary to input an image file at this stage.

The CPU 61 displays an image file selection screen on the display unit 51 and extracts an image file to be processed from the storing unit 62 on the basis of a selecting operation of the user (step S12). The CPU 61 checks image capturing conditions from the tag information included in the image file (step S13) and specifies a parameter for correcting a chromatic aberration on the basis of the image capturing conditions (step S14). It is assumed that information indicative of optical characteristics of an image capturing optical system as the image capturing apparatus 1a connected to the computer 50 is preliminarily registered in the storing unit 62.

The filter for chromatic aberration correction is generated on the basis of the parameters obtained in step S13 (step S15), a filter computation is performed on the RAW data with the filter for chromatic aberration correction, thereby correcting the chromatic aberration (step S16).

After correcting the chromatic aberration, the CPU 61 performs a color interpolating process (step S17). The color interpolating process is performed by the filter computation to which, for example, the filter 201 shown in FIG. 5 is applied. That is, in the present preferred embodiment, the chromatic aberration correcting process is performed prior to the color interpolating process on RAW data. Consequently, the chromatic aberration correcting process can be made function excellently, and high-precision chromatic aberration correction can be performed. In the present preferred embodiment as well, the chromatic aberration correcting process and the color interpolating process can be performed concurrently as described in the foregoing preferred embodiments.

By performing the chromatic aberration correcting process and the color interpolating process, an image signal (image data) including information of the color component of each of R, G and B in each pixel is generated. γ correction is performed on the image data to decrease the number of bits of the pixel signal of each color component from 12 bits to 8 bits (step S18). By the γ correction, in addition to general γ correction, a tone decreasing process is simultaneously performed.

Other image processes such as a color space converting process and a line segment extracting process are performed (step S19). Further, image compression is carried out and a process of recording a resultant image to the storing unit 62 is performed (step S20).

The computer 50 functions as an image processing apparatus as described above and is constructed so as to perform the chromatic aberration correcting process of correcting a chromatic aberration caused by the image capturing optical system 31 on an image signal entered from the image capturing apparatus 1a prior to the color interpolating process for interpolating a dropout color component pixel by pixel. Therefore, chromatic aberration correction can be made at high precision.

At the time of inputting an image signal, the image capturing condition information at the time of capturing the image is also inputted, and parameters applied to the chromatic aberration correcting process are determined on the basis of the image capturing condition information. Consequently, the optical conditions of an image as an object of the image process can be grasped, and proper chromatic aberration correction can be performed so as to be adapted to the optical conditions at the time of image capturing.

6. Modifications

Although the preferred embodiments of the present invention have been described above, the present invention is not limited to the above.

For example, the case where the image center is disposed so as to coincide with the center position of the optical axis L of the image capturing optical system 31 has been described in each of the foregoing preferred embodiment. However, when the image center and the center position of the optical axis L do not coincide with each other, a parameter such as a deviation amount may be specified on the basis of the center position of the optical axis L.

Figure 24:
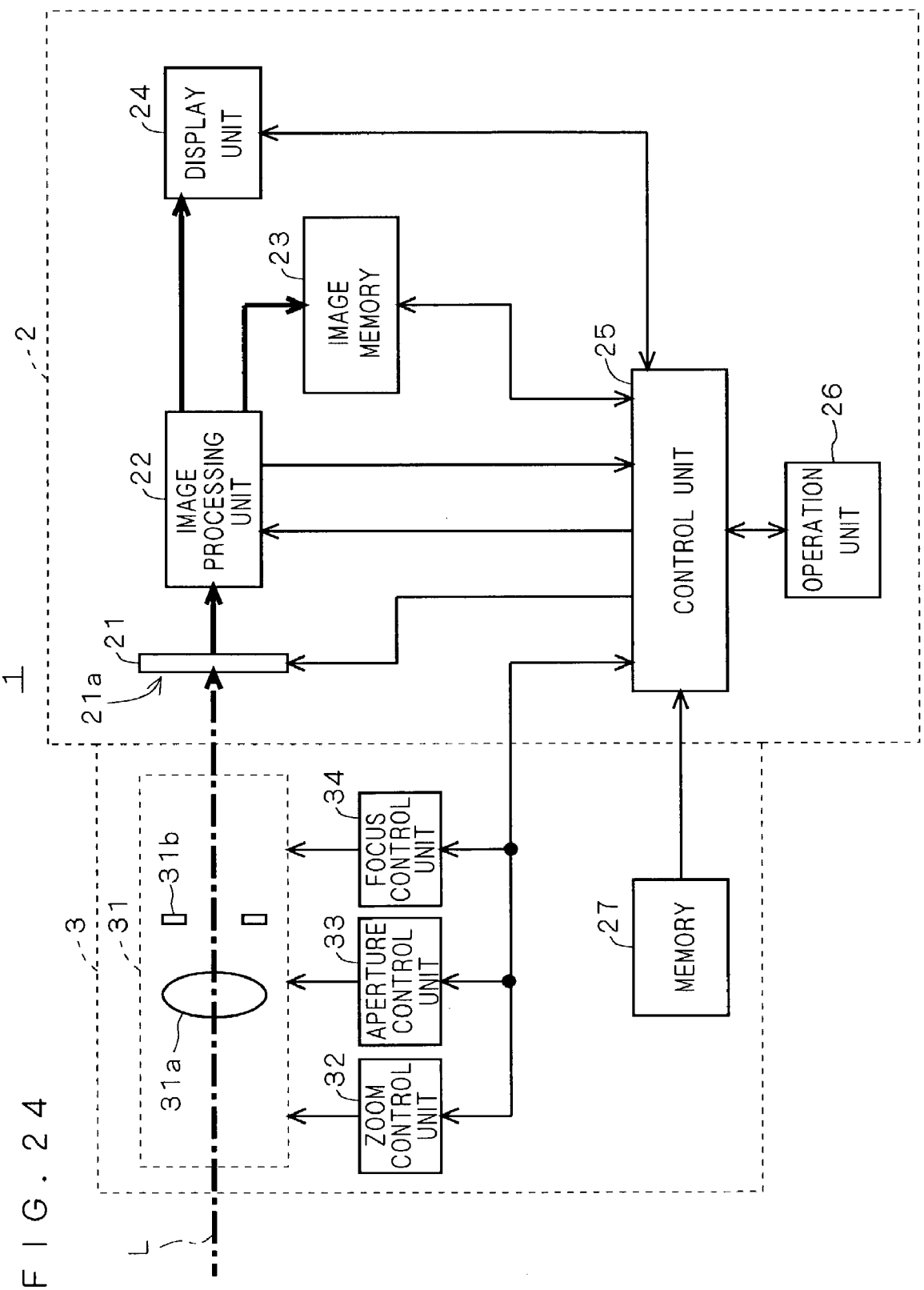
FIG. 24 is a block diagram showing a schematic configuration of an image capturing apparatus in which a memory is provided on a lens unit side.

In the case where the lens unit 3 is exchangeable in the image capturing apparatus 1 of FIG. 1, when the memory 27 is disposed in the body 2, the parameter for chromatic aberration correction has to be stored in the memory 27 for each lens unit. Consequently, as shown in FIG. 24, the memory 27 may be disposed on the lens unit 3 side. In FIG. 24, the same reference numerals as those in FIG. 1 are assigned to the same members.

While the invention has been shown and described in detail, the foregoing description is in all aspects illustrative and not restrictive. It is therefore understood that numerous modifications and variations can be devised without departing from the scope of the invention.

What is claimed is:

1. An image capturing apparatus comprising:
   an image capturing optical system;
   a color image sensor for converting a light image obtained by said image capturing optical system into an image signal having a color component which varies according to a pixel;
   a divider for dividing an image signal generated by said color image sensor into a plurality of blocks, said blocks becoming finer with distance from an optical axis of said image capturing optical system;
   a memory for storing a parameter for chromatic aberration correction applied to each block divided by said divider; and
   an image processor for correcting a chromatic aberration caused by said image capturing optical system by the block on the basis of the parameter stored in said memory on an image signal generated by said color image sensor.

2. The image capturing apparatus according to claim 1, wherein
   said image processor performs chromatic aberration correction by using parameters applied to peripheral blocks onto an image signal to be processed.

3. The image capturing apparatus according to claim 1, wherein
   said block specified to an image signal is specified so as to be varied according to a color component generated by said color image sensor.

4. The image capturing apparatus according to claim 1, wherein
   said parameter is a deviation amount of a chromatic aberration.

5. The image capturing apparatus according to claim 1, wherein
   said image processor also performs a color interpolating process of interpolating a dropout color component pixel by pixel.

6. The image capturing apparatus according to claim 1, wherein
   said image processor performs a chromatic aberration correcting process which varies according to an image capturing condition.

7. An image processing apparatus for performing an image process on an image signal which is generated on the basis of a light image received via an image capturing optical system and has a color component which varies according to a pixel, comprising:
   an input unit for inputting said image signal;
   a divider for dividing said image signal into a plurality of blocks;
   a memory for storing a parameter for chromatic aberration correction applied to each block divided by said divider; and
   an image processor for correcting a chromatic aberration caused by said image capturing optical system by the block on the basis of the parameter stored in said memory on said image signal,
   wherein said block specified to said image signal becomes finer with distance from an optical axis of said image capturing optical system.

8. A computer-readable medium encoded with a computer program which allows a computer to perform a process on an image signal which is generated on the basis of a light image received via an image capturing optical system and has a color component which varies according to a pixel, the process comprising the steps of:
   (a) inputting said image signal;
   (b) dividing said image signal into a plurality of blocks;
   (c) storing a parameter for chromatic aberration correction applied to each block divided in said step (b) into a memory; and
   (d) correcting a chromatic aberration caused by said image capturing optical system by the block on the basis of the parameter stored in said memory on said image signal,
   wherein said block specified to said image signal becomes finer with distance from an optical axis of said image capturing optical system.

* * * * *